(12) United States Patent
Haot et al.

(10) Patent No.: US 8,764,569 B2
(45) Date of Patent: *Jul. 1, 2014

(54) SYSTEMS, METHODS AND COMPUTER SOFTWARE FOR LIVE VIDEO/AUDIO BROADCASTING

(75) Inventors: Max Haot, New York, NY (US); Lior Messinger, New York, NY (US)

(73) Assignee: Livestream LLC, New York, NY (US)

( * ) Notice: Subject to any disclaimer, the term of this patent is extended or adjusted under 35 U.S.C. 154(b) by 203 days.

This patent is subject to a terminal disclaimer.

(21) Appl. No.: 13/397,125

(22) Filed: Feb. 15, 2012

(65) Prior Publication Data

US 2012/0144001 A1 Jun. 7, 2012

Related U.S. Application Data

(63) Continuation of application No. 12/474,818, filed on May 29, 2009, now Pat. No. 8,128,503.

(60) Provisional application No. 61/057,135, filed on May 29, 2008, provisional application No. 61/169,181, filed on Apr. 14, 2009.

(51) Int. Cl.
*G06F 17/30* (2006.01)

(52) U.S. Cl.
USPC .................. 463/42; 375/E7.006; 375/E7.007

(58) Field of Classification Search
USPC ........... 463/42; 709/220; 375/E7.006, E7.007
See application file for complete search history.

(56) References Cited

U.S. PATENT DOCUMENTS

| | | | |
|---|---|---|---|
| 6,085,236 A | 7/2000 | Lea | |
| 6,314,466 B1 | 11/2001 | Argwal et al. | |
| 6,877,010 B2 | 4/2005 | Smith-Semedo et al. | |
| 2009/0219639 A1 | 9/2009 | Marman et al. | |

*Primary Examiner* — Thomas L Dickey
(74) *Attorney, Agent, or Firm* — Greenberg Traurig, LLP

(57) ABSTRACT

One embodiment of the present invention is directed to a system for live video/audio broadcasting (e.g., game broadcasting). Another embodiment of the present invention is directed to a method for live video/audio broadcasting (e.g., game broadcasting). Another embodiment of the present invention is directed to computer software for live video/audio broadcasting (e.g., game broadcasting).

38 Claims, 18 Drawing Sheets

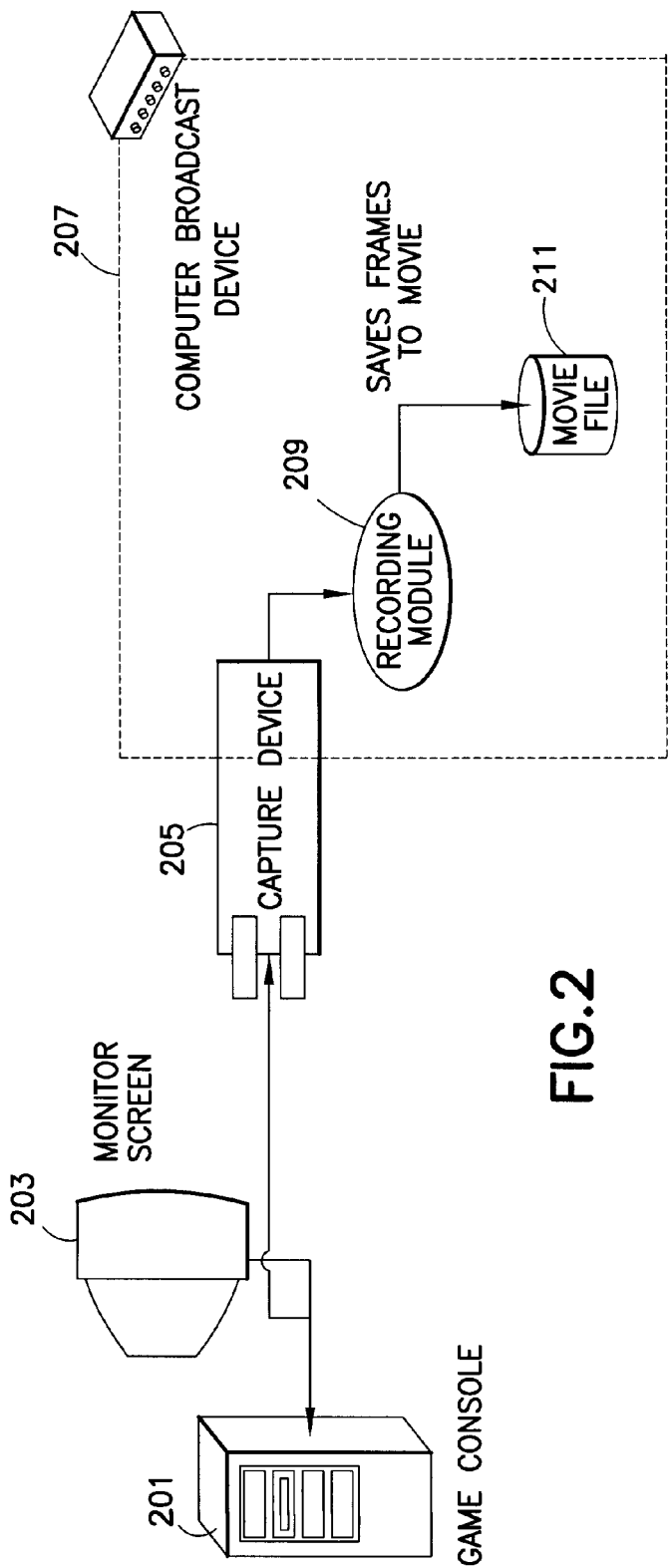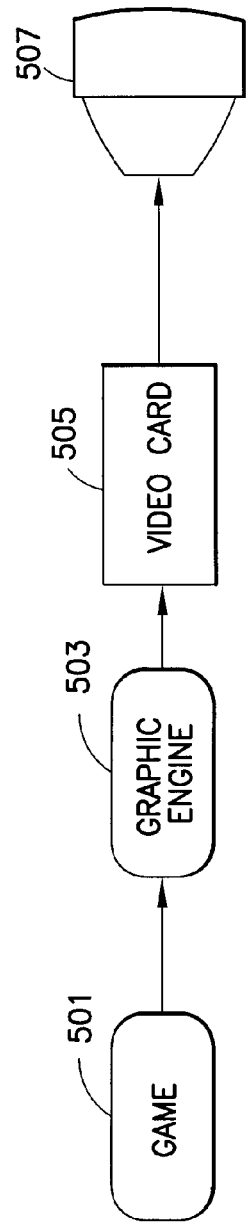

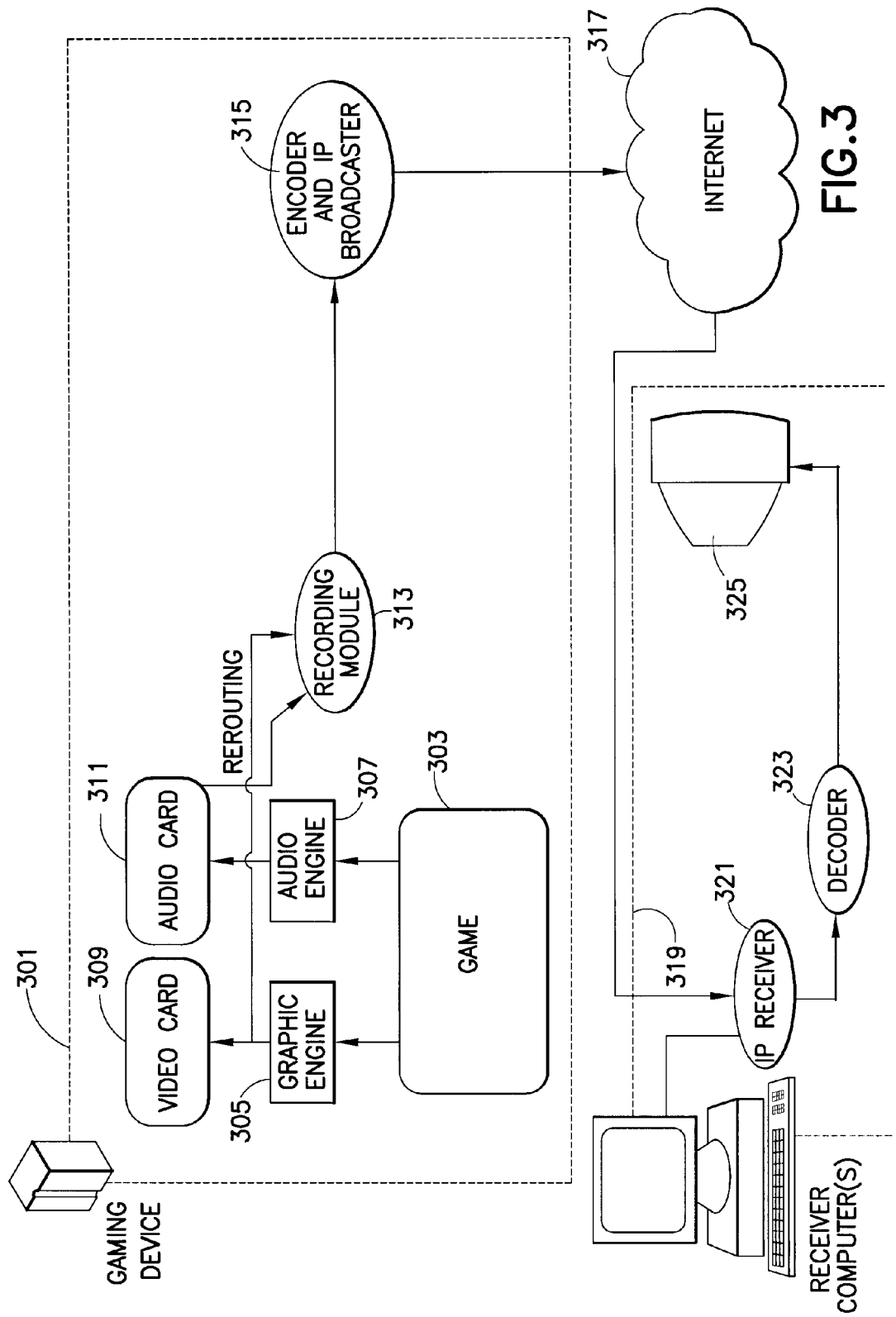

SYSTEMS, METHODS AND COMPUTER SOFTWARE FOR LIVE VIDEO/AUDIO BROADCASTING

RELATED APPLICATIONS

This application claims the benefit of U.S. Provisional Application Ser. No. 61/169,181, filed Apr. 14, 2009 and U.S. Provisional Application Ser. No. 61/057,135, filed May 29, 2008, each of which is incorporated herein by reference in its entirety.

FIELD OF THE INVENTION

One embodiment of the present invention is directed to a system for live video/audio broadcasting (e.g., game broadcasting).

Another embodiment of the present invention is directed to a method for live video/audio broadcasting (e.g., game broadcasting).

Another embodiment of the present invention is directed to computer software for live video/audio broadcasting (e.g., game broadcasting).

In one example, the live video/audio information may correspond to one or more of (but not be limited to): (a) video and/or audio associated with a computer desktop; (b) video and/or audio associated with a computer application; (c) video and/or audio associated with a computer game; and/or (d) video and/or audio associated with a feed from a camera (e.g., a webcam).

For the purposes of describing and claiming the present invention the terms "live" and "real-time" are intended to refer to computer systems that update information at essentially the same rate that they receive information (that is, without substantial time lag).

For the purposes of describing and claiming the present invention the term "desktop software" is intended to refer to software that is installed on a computer (as opposed, for example, to: software that is resident on a server computer and run on a client computer; or software that runs inside of a web browser). In this regard, the term "desktop software" encompasses software installed, for example, on a desktop computer or a laptop computer.

For the purposes of describing and claiming the present invention the term "server software" is intended to refer to software that runs on a server computer (as opposed, for example, to a client computer).

For the purposes of describing and claiming the present invention the term "zoomed-in" is intended to refer to a view of a portion of an image.

For the purposes of describing and claiming the present invention the term "non-zoomed-in" is intended to refer to a view of an entire image.

For the purposes of describing and claiming the present invention the term "buffer" is intended to refer to solid-state memory (e.g. RAM).

For the purposes of describing and claiming the present invention the term "module" (e.g., software module) is intended to refer to software in the form of a driver, a dynamic link library ("DLL"), an executable ("EXE"), or the like.

For the purposes of describing and claiming the present invention the term "process" is intended to refer to an instance of a computer program that is being executed.

For the purposes of describing and claiming the present invention the term "capture device" is intended to refer to a hardware device that is associated with a computer and effectively captures video and/or audio packets originating from a second computing device.

BACKGROUND OF THE INVENTION

Video games are a major genre of entertainment. There is a growing market for games, gaming leagues and news stories. In this regard, techniques have arisen to document and record the happenings and events. Methods to enable recording of video games into movies include the following:

1. A software module grabs shots of the screen, and sound data from a sound card, to save them as frames in a movie (see FIG. 1); or 2. A hardware capture device is hooked between a game console and a screen or a PC and a screen, and the hardware capture device places the stream into a PC or other device for recoding as a movie (see FIG. 2).

Of note, video games are typically played either on a personal computer or on a dedicated game console. The term "game device" may sometimes be used herein to refer either to a game console or a personal computer on which games are played. A game device is typically connected to a 2D screen. To record the games into movies, a recording module may grab shots of the screen and save them as frames in a movie. The recording module would also query the sound card driver iteratively to get data related to the currently played sound (see FIG. 1, showing game device 101, game 103, graphic engine 105, audio engine 107, video card 109, audio card 111, recoding module 113 and movie file 115).

In the case where the recording is performed on a separate computer or device that is not the game device, the cable output of the game device may be connected to a capture device which reroutes the frames into the computer. This computer captures the frames and the audio (e.g., several times a second) and saves the frames and audio data into a movie. The capture device could be installed as part of the computer, as a video capture card or be a separate device altogether. The computer is typically a personal computer but could also be a device with Internet Protocol Broadcasting capabilities (see FIG. 2, showing game device 201, monitor 203, capture device 205, computer 207, recoding module 209 and movie file 211).

BRIEF DESCRIPTION OF THE DRAWINGS

FIG. 2 shows a block diagram of a conventional gaming device/capture device.

FIG. 3 shows a block diagram of a system according to an embodiment of the present invention.

FIG. 5 shows a block diagram of a system according to another embodiment of the present invention.

FIGS. 8A and 8B show example screenshots to reflect the effect of live video stream output from an application according to an embodiment of the present invention (in 3D mode showing, in each of FIGS. 8A and 8B, a live camera and live game capture).

Figure 1:
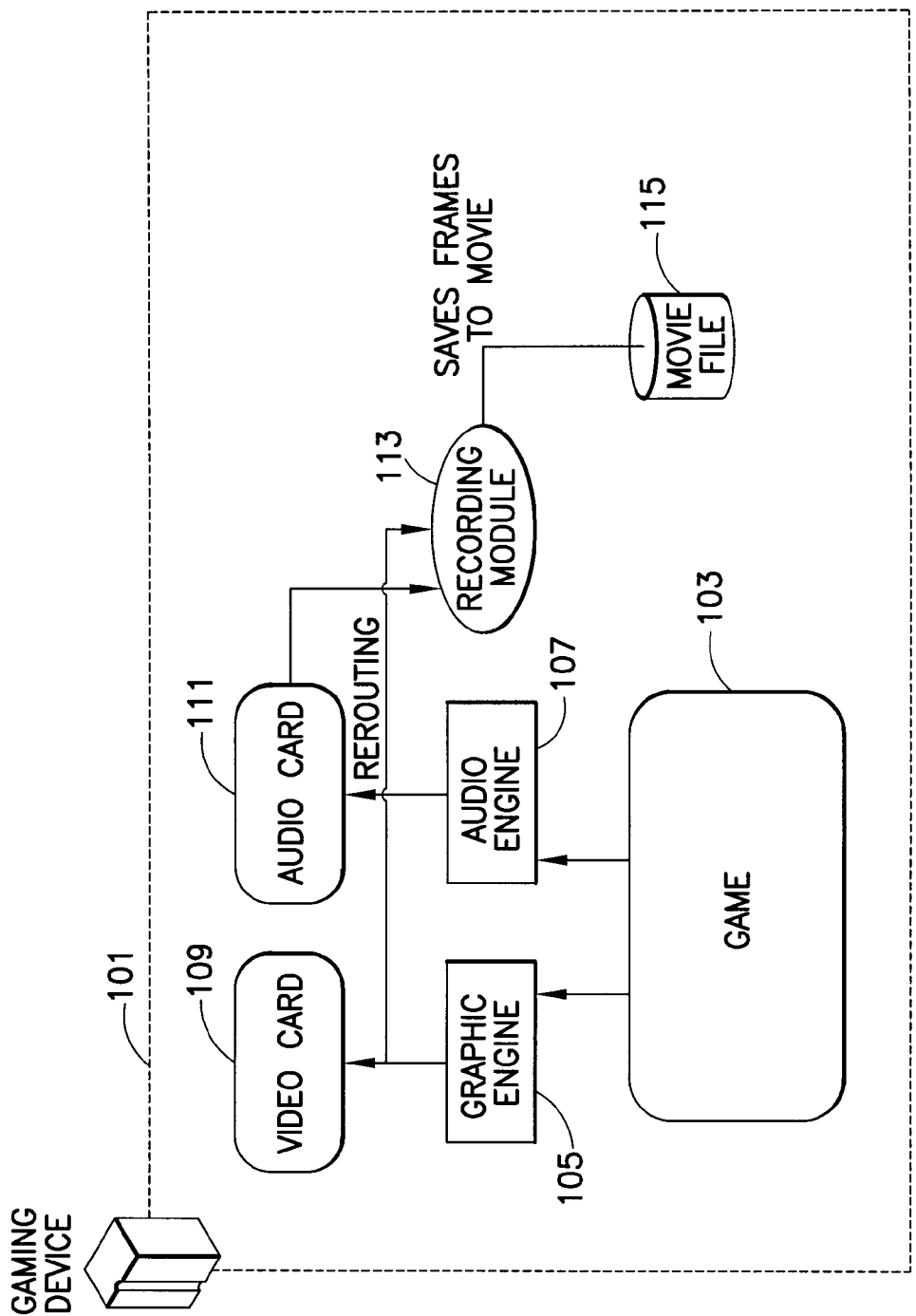
FIG. 1 shows a block diagram of a conventional gaming device.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components (and any data, size, material and similar details shown in the figures are, of course, intended to be illustrative and not restrictive). Therefore, specific structural and functional details disclosed herein are not to be interpreted as limiting, but merely as a representative basis for teaching one skilled in the art to variously employ the present invention.

In one embodiment of the present invention a mechanism (e.g., software and/or hardware) may be provided to broadcast video games and/or movies live. In this regard, as video games become similar to sports, live video game broadcasting may be important for several usages, including, but not limited to:

1. Enabling users to share with friends their experience essentially without delay
2. Live, essentially no delay news feeds from virtual worlds events
3. Assistance to players during games and virtual battles
4. Communication between team players during games In one embodiment of the present invention a mechanism (e.g., software and/or hardware) may be introduced before, after or instead of a conventional movie saving module. Instead of (or in addition to) saving the movie to a file, various embodiments of the present invention may provide for a live broadcasting module (e.g., the video frames of the game may be encoded using a movie encoder such as, for example, h264, h263, and/or other encoder which is aimed at reducing frame size). The audio may be encoded and interleaved into the movie, for example, using industry-standard encoders such as AAC, MP3 and/or any other compressors. The game may then be broadcast as a stream of frames, using Internet Broadcasting Protocols such as, for example, RTSP, RTP, UDP, TCP/IP and/or others. At the receiving side, standard and/or proprietary methods could be used to view the live broadcast. In various examples, the game broadcast could either go directly to another computer, or to a streaming server which broadcasts it to several receiving clients. At the receiving side, a receiver may translate the byte stream into frames which are decoded into frames. In one example, the receiver and decoder can work as one integrated module.

One example describing the steps to broadcast live from video games is as follows:

1. A software driver obtains shots of the screen from computer memory (e.g., directly from computer memory)
2. The software driver places the obtained shots of the screen in a driver memory
3. A software module is connected to the driver memory
4. The software module encodes the frames from the driver memory
5. The software broadcasts the frames using Internet protocol(s)

With reference now to FIG. 3, it is seen that one embodiment of the present invention utilizes the following: game device 301, game 303, graphic engine 305, audio engine 307, video card 309, audio card 311, recoding module 313 (of note, in this example recording may be enabled and the "recording module" may operate to enable both recording and live broadcasting; when recording is not enabled, the "recording module" 313 would operate to enable live broadcasting only), Internet 317, receiver computer(s) 319, IP receiver 321, decoder 323 and monitor 325).

Figure 4:
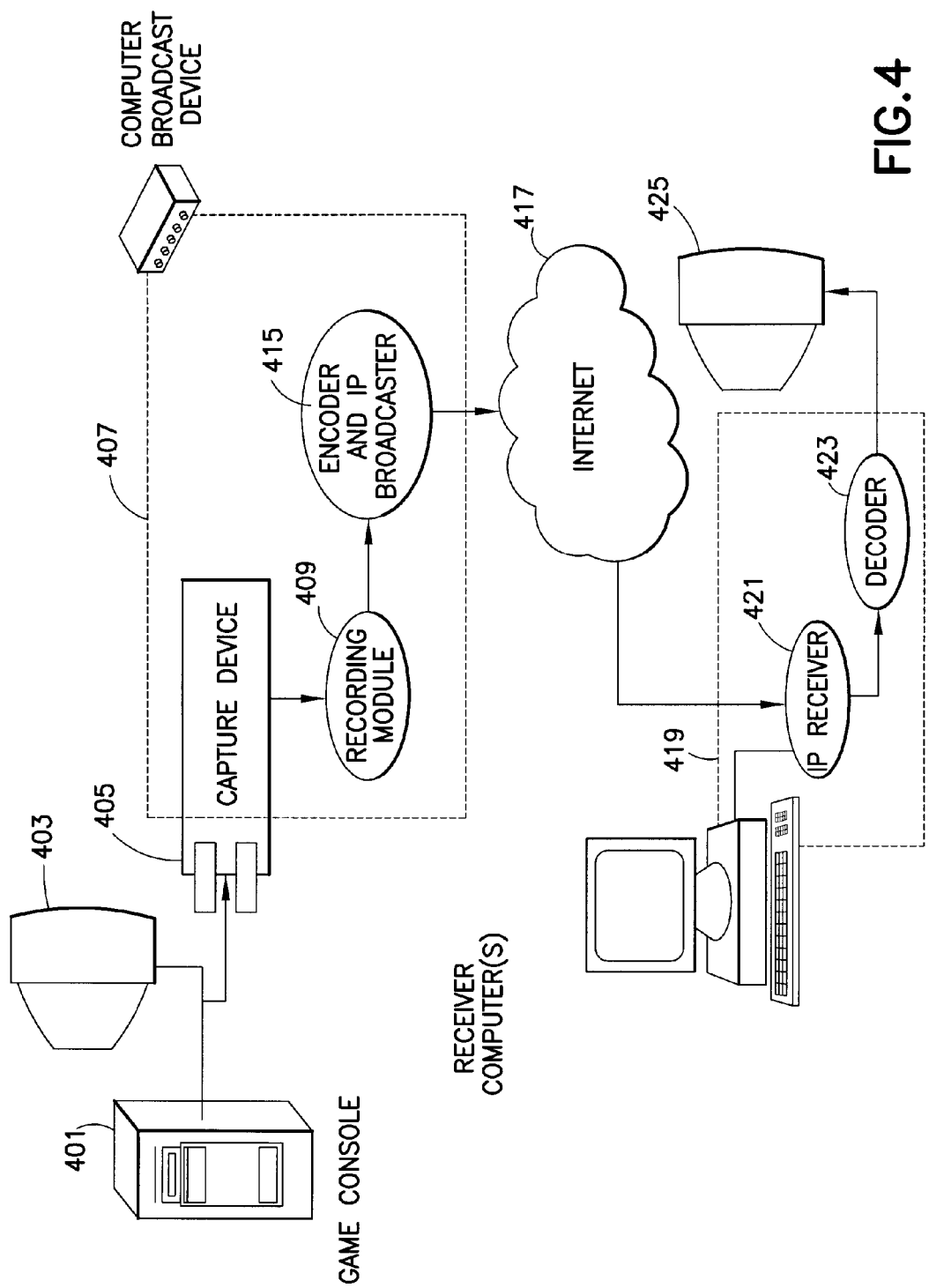
FIG. 4 shows a block diagram of a system according to another embodiment of the present invention.

In the case where a separate computer is doing the broadcasting, the cable output of the game device may be connected to a device which reroutes the frames into this broadcast computer. The frames may be transferred into the broadcast computer using (for example) a hardware port, a software driver may read the frames and put them in driver memory and from that point the broadcasting may be performed (see FIG. 4, showing game device 401, monitor 403, capture device, 405, computer 407, recoding module 409 (again, of note, in this example recording may be enabled and the "recording module" may operate to enable both recording and live broadcasting; when recording is not enabled, the "recording module" 313 would operate to enable live broadcasting only), encoder and IP broadcaster 415, Internet 417, receiver computer(s) 419, IP receiver 421, decoder 423 and monitor 425).

Of note, the broadcasting "computer" could be any device with, for example, Internet Protocol Broadcasting capabilities.

Reference will now be made to a detailed example of a video game implementation of an Encoder and IP Broadcasting Module as an Instant Messenger (sometimes referred to herein as "IM"). Video games typically present their visual by iteratively calculating positions of their entities and then drawing them on the screen. This process happens typically 20 times per seconds (and optimally more). The drawing of the screen is typically done by a special video card which receives the positions of the entities (in 2D or 3D space coordinates), their shapes and textures, and converts the information into a 2D picture by a set of mathematical transformations. The 2D picture is typically stored at a screen buffer which is presented at the 2D monitor that is used to display the game. The games typically include a graphic engine to connect to the video card, such as (for example) DirectX or OpenGL (see FIG. 5, showing that: game 501 may provide output to graphic engine 503, which may provide output to video card 505, which may provide output to monitor 507).

A video game's audio, much like any other computerized audio, typically works by encoding sounds as byte data and sending them to the sound card.

To broadcast the game live, a software module according to an embodiment of the present invention needs to capture the 2D screen buffer and the audio. To capture the screen buffer, after the graphic engine calls the video card driver to render the screen, a call may be made to the Recording Module. The Recording Module may call the video card and copy the screen buffer to its own buffer. This buffer may then be passed to an Encoder and IP Broadcaster module. The Encoder and IP Broadcaster module may run (for example) in a separate memory address space, so the passing of the buffer may need to be done through a shared memory. For example, the Encoder and IP Broadcaster module could be an Instant Messenger application. This Instant Messenger (IM) may operate by querying a virtual camera driver, written specially to hold and pass the data from the Recording Module to the Instant Messenger. This may be performed several times a second, in order to broadcast an animated movie, live.

Figure 6:
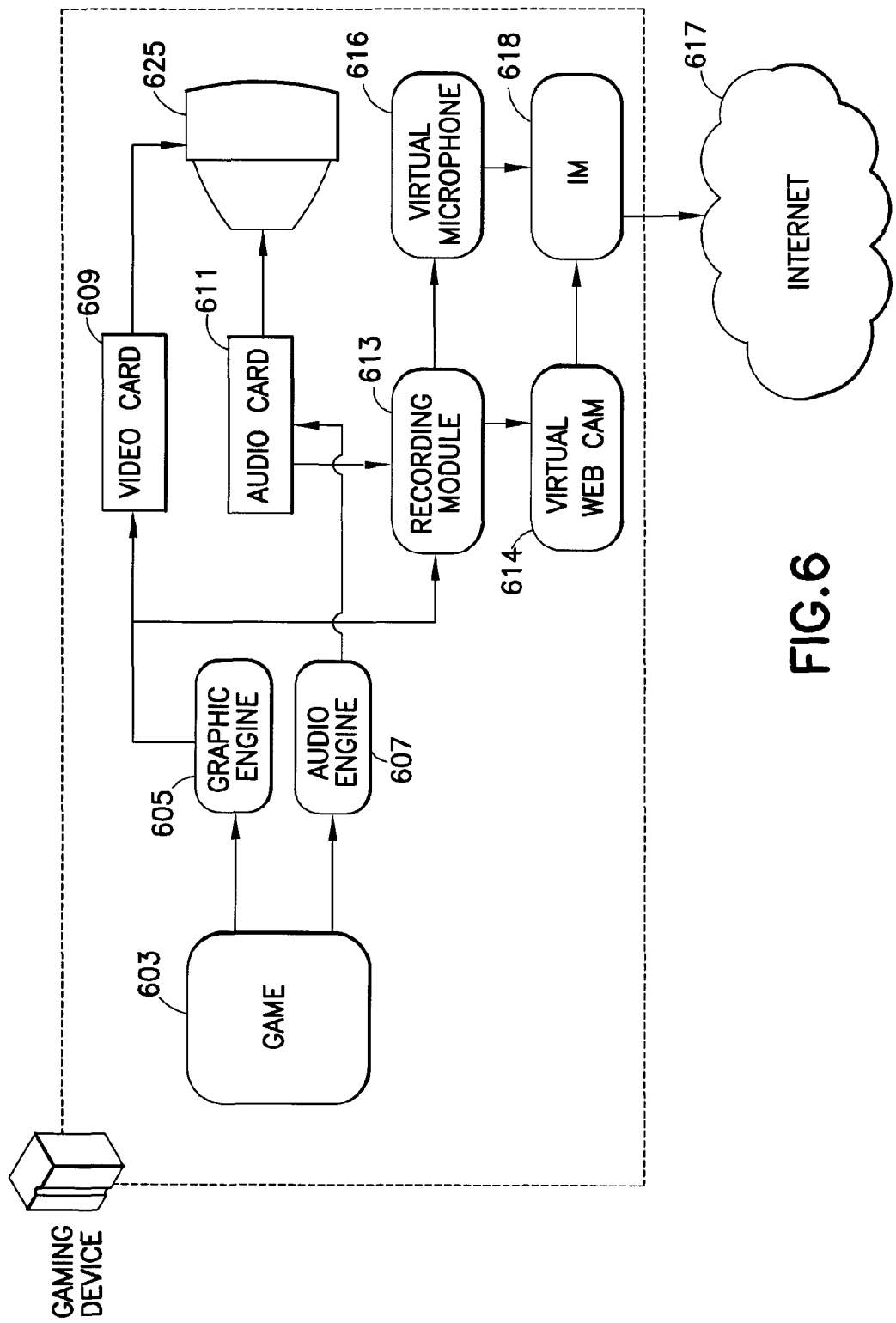
FIG. 6 shows a block diagram of a system according to another embodiment of the present invention.

To capture and broadcast the audio, a module according to an embodiment of the present invention may query the audio card driver, for example, several times a second—each time bringing back sound data. This may be done via a software layer such as, for example, WASAPI in Windows Vista, or via other drivers of the audio card, that supply channels to receive the audio. If an IM is used to broadcast the game, the IM may use a virtual microphone driver to obtain the audio. This means that the IM may select a special microphone that is not connected to an external microphone (and not bringing audio from an external hardware microphone), but is connected to the recording module of the audio bringing audio from the game (see FIG. 6, showing that one embodiment of the present invention utilizes the following: game device 601, game 603, graphic engine 605, audio engine 607, video card 609, audio card 611, recoding module 613 (of note, in this example recording may be enabled and the "recording module" may operate to enable both recording and live broadcasting; when recording is not enabled, the "recording module" 613 would operate to enable live broadcasting only), virtual webcam 614, virtual microphone 616, IM 618, Internet 617 and monitor 625).

Of note, the broadcasting could be done by any desired module and not only an Instant Messenger. For example, many Internet browsers have plug-ins such as Flash, that allows them to connect to a microphone and a camera. In addition, a dedicated broadcasting module could skip the need for a web cam and a virtual microphone driver, and interface directly with the recording module.

The recording module may connect between the graphic engine and the video card driver, but could (in another example) be connected directly to the game. Additionally, the broadcasting could be performed from a computer or device which is separate from the game device. In this case, a cable splitter may reroute game device output to a capture device and the broadcasting device, as depicted in FIG. 4, for example.

Figure 7A:
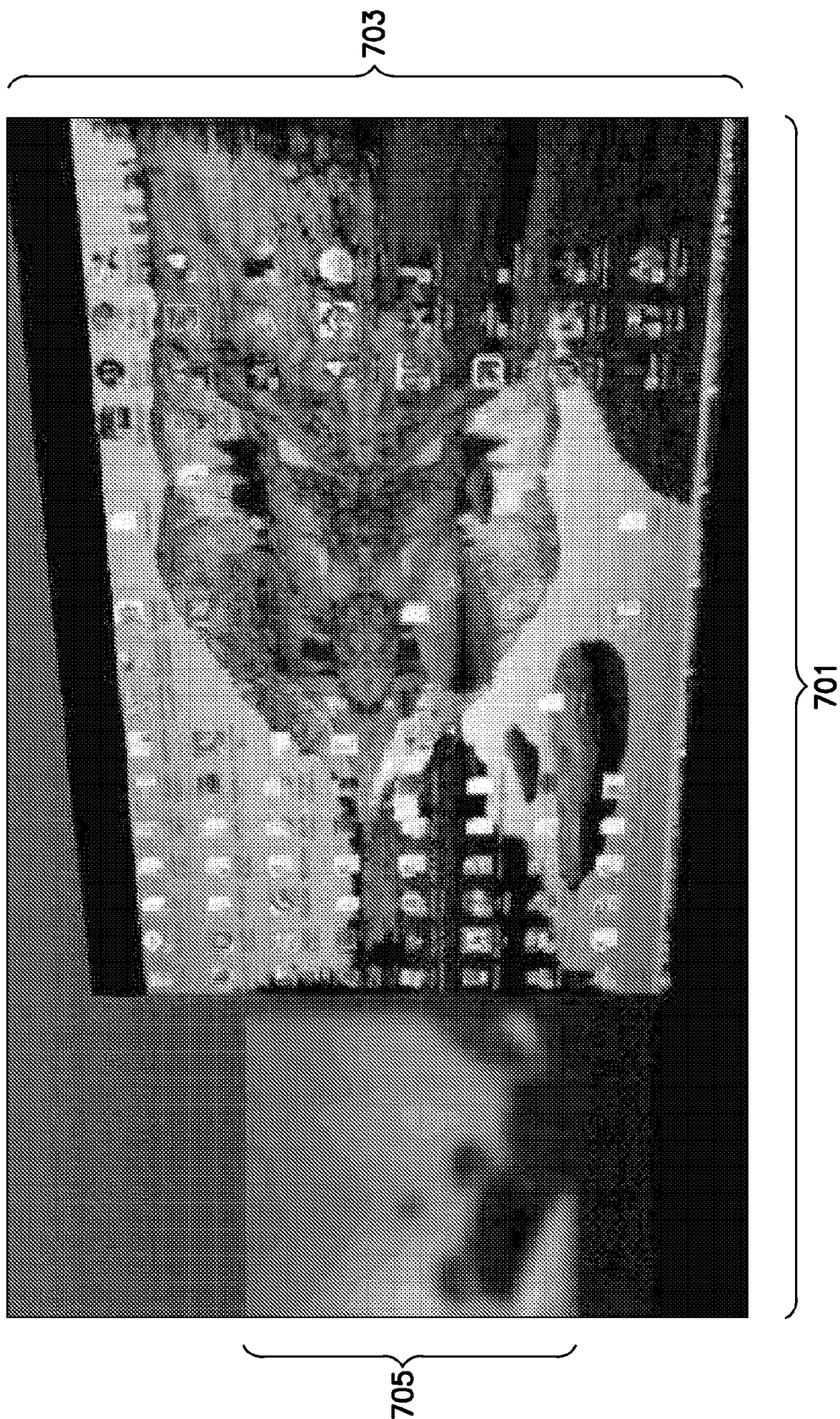
FIGS. 7A and 7B show example screenshots to reflect the effect of live video stream output from an application according to an embodiment of the present invention (in 3D mode showing, in each of FIGS. 7A and 7B, a live camera and live desktop capture).
Figure 7B:
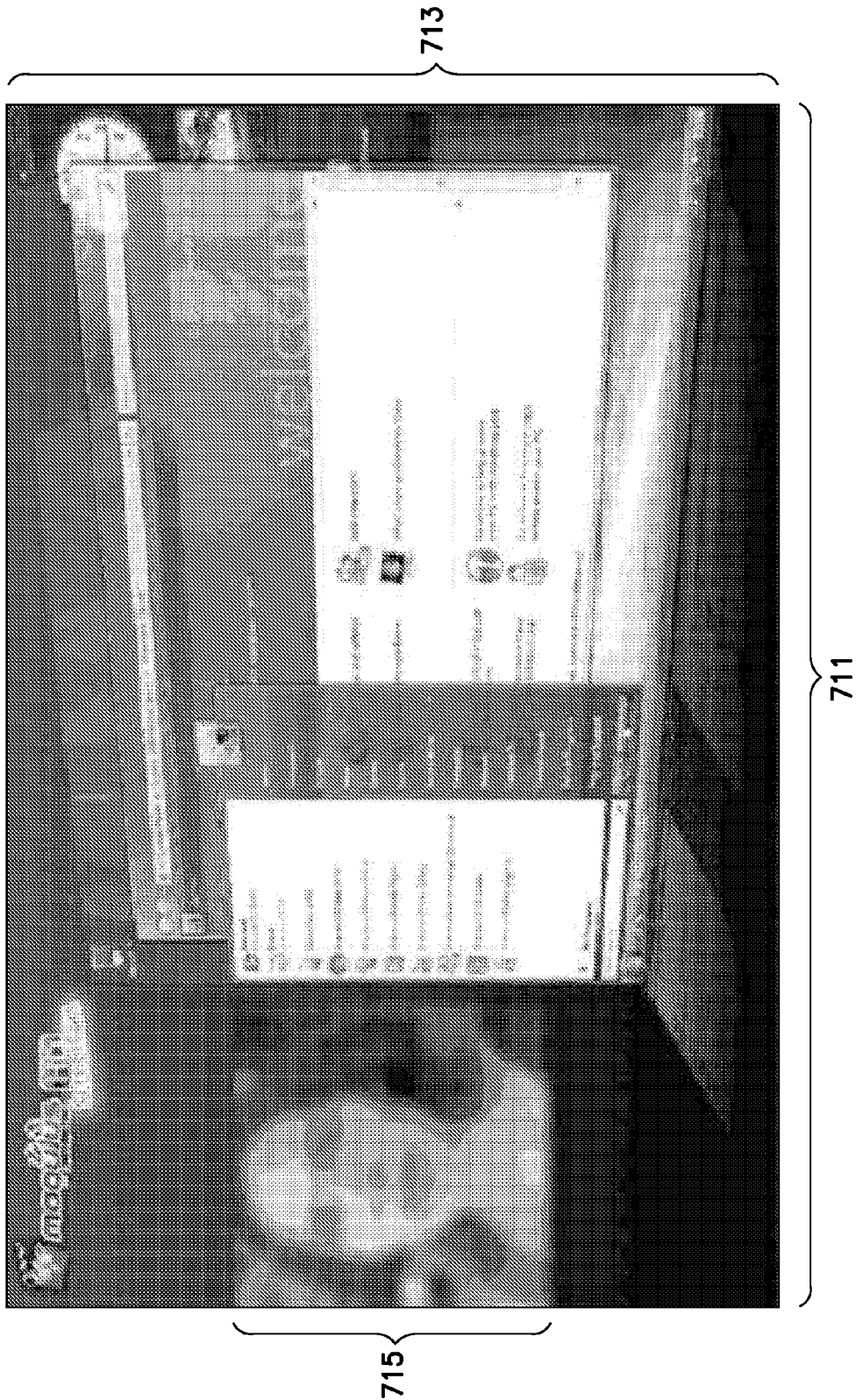

Referring now to FIGS. 7A and 7B, these Figs. show example screenshots to reflect the effect of live video stream output from an application according to an embodiment of the present invention (in 3D mode showing a live camera and live desktop capture). More particularly, an entire view is shown by 701, a live desktop view 703 forms part of entire view 701 and a live camera view 705 forms another part of entire view 701. Further, an entire view is shown by 711, a live desktop view 713 forms part of entire view 711 and a live camera view 715 forms another part of entire view 711.

Figure 8B:
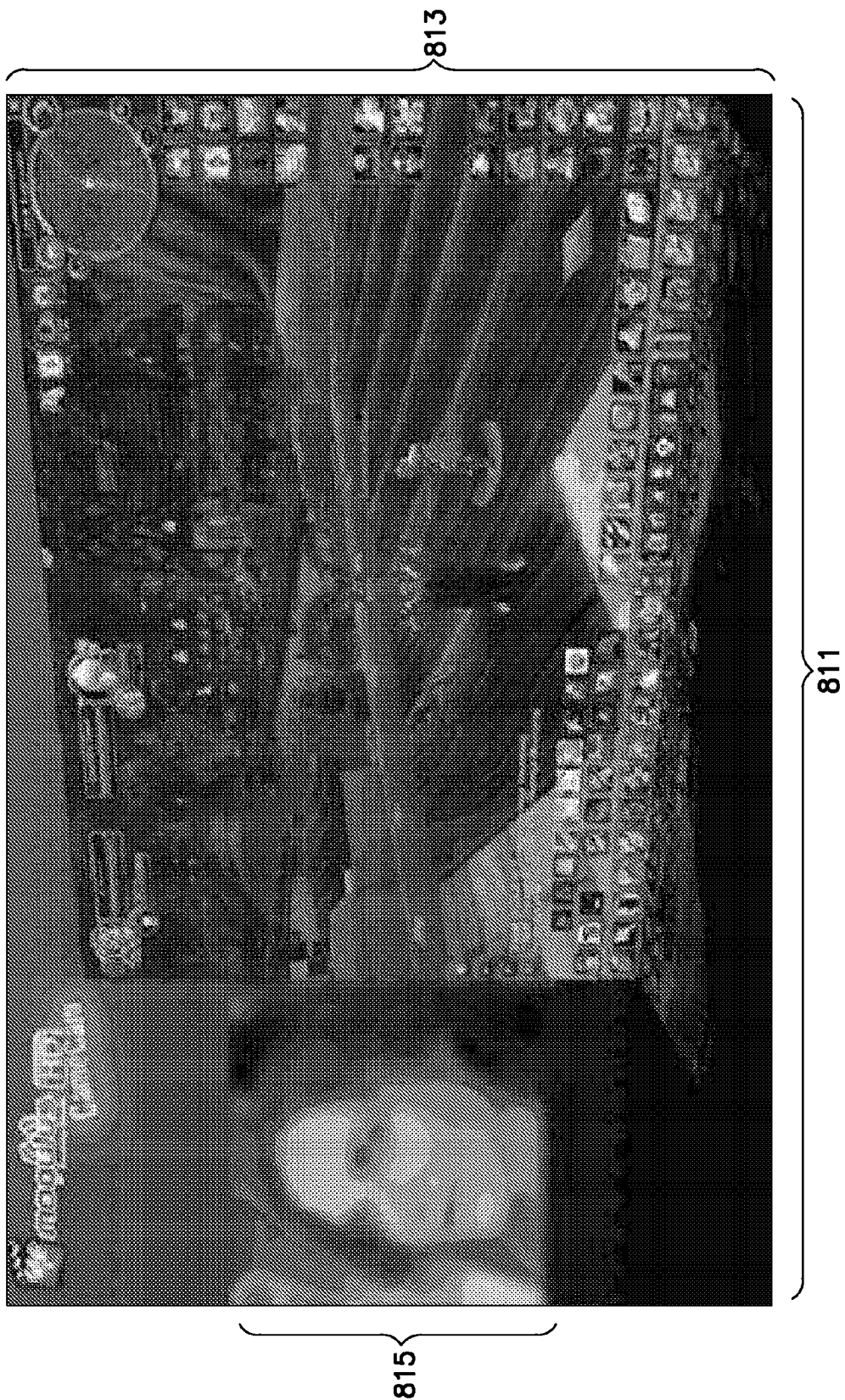

Referring now to FIGS. 8A and 8B, these Figs. show example screenshots to reflect the effect of live video stream output from an application according to an embodiment of the present invention (in 3D mode showing a live camera and live game capture). More particularly, an entire view is shown by 801, a live game capture view 803 forms part of entire view 801 and a live camera view 805 forms another part of entire view 801. Further, an entire view is shown by 811, a live game capture view 813 forms part of entire view 811 and a live camera view 815 forms another part of entire view 811.

Figure 9A:
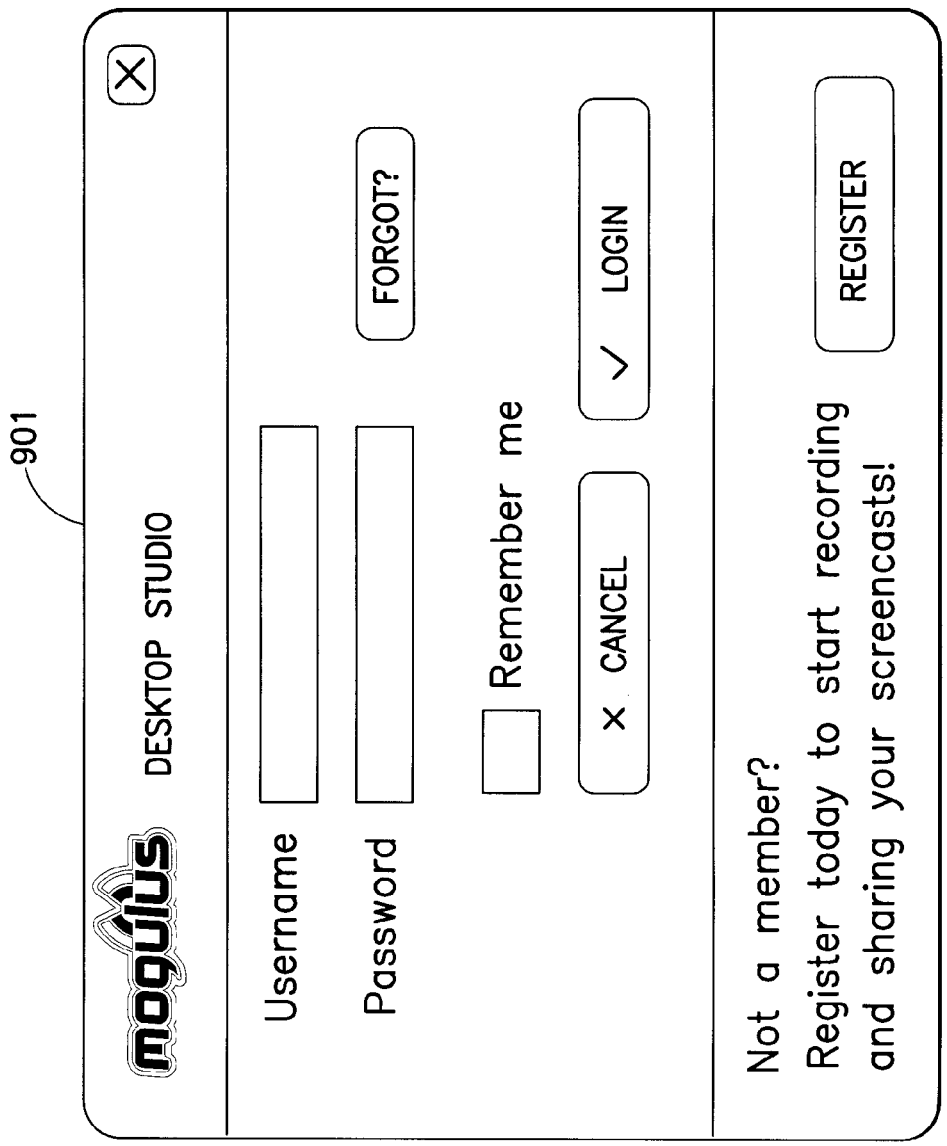
FIGS. 9A-9G show example screenshots for an application according to an embodiment of the present invention (in this example, for Windows XP/Vista).
Figure 9B:
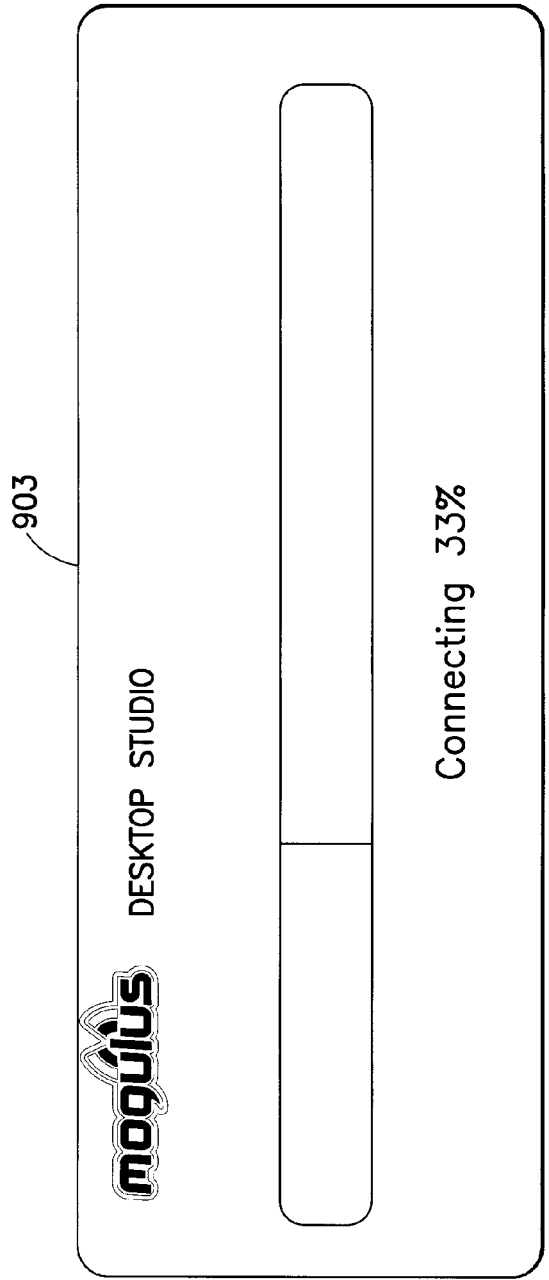
Figure 9D:
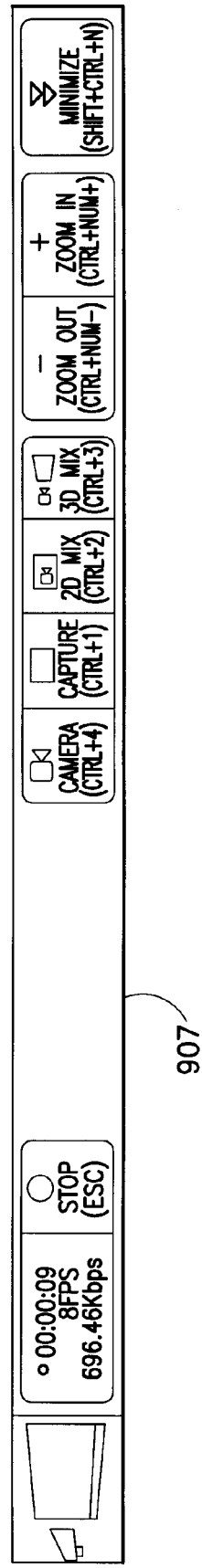
Figure 9C:
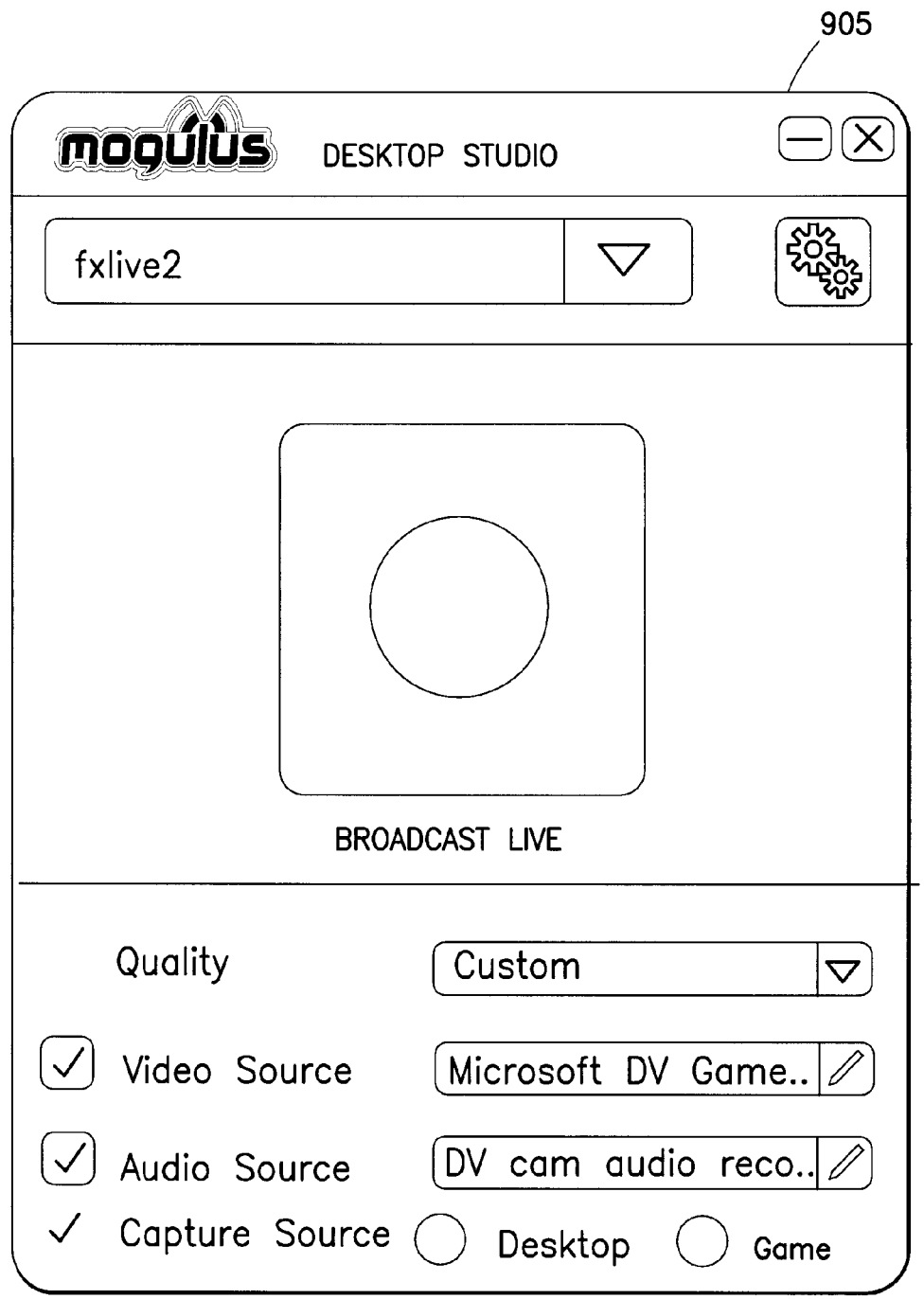
Figure 9E:
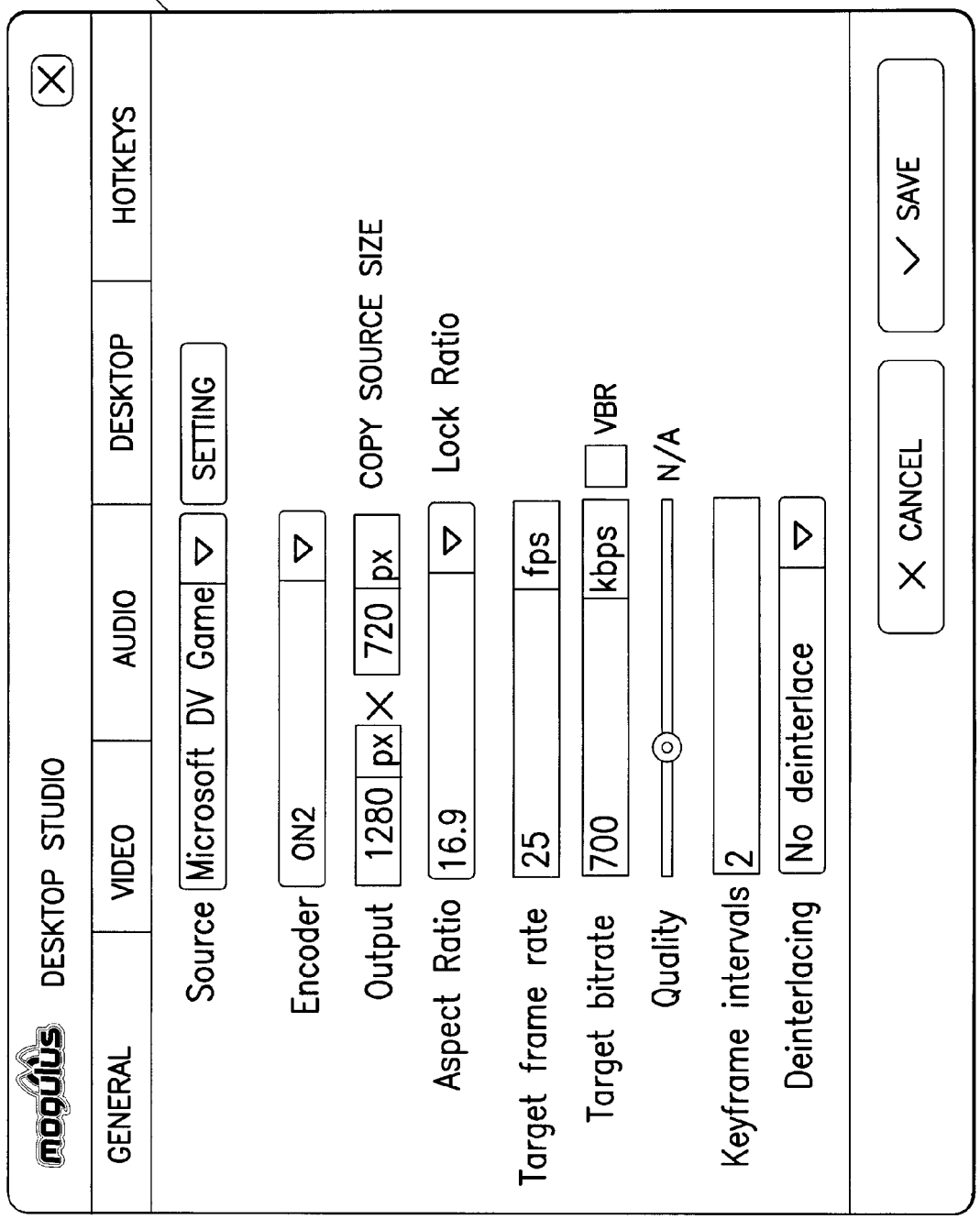
Figure 9F:
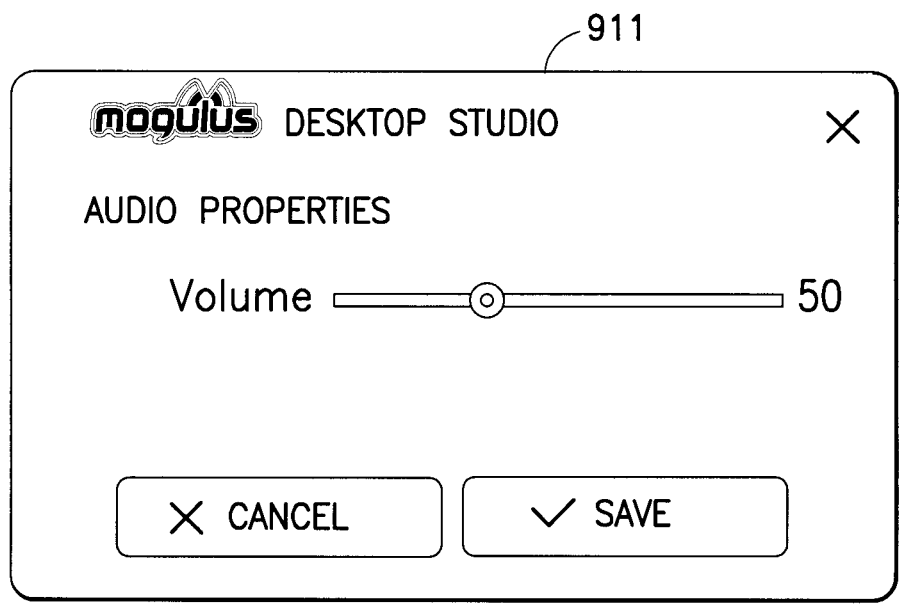
Figure 9G:
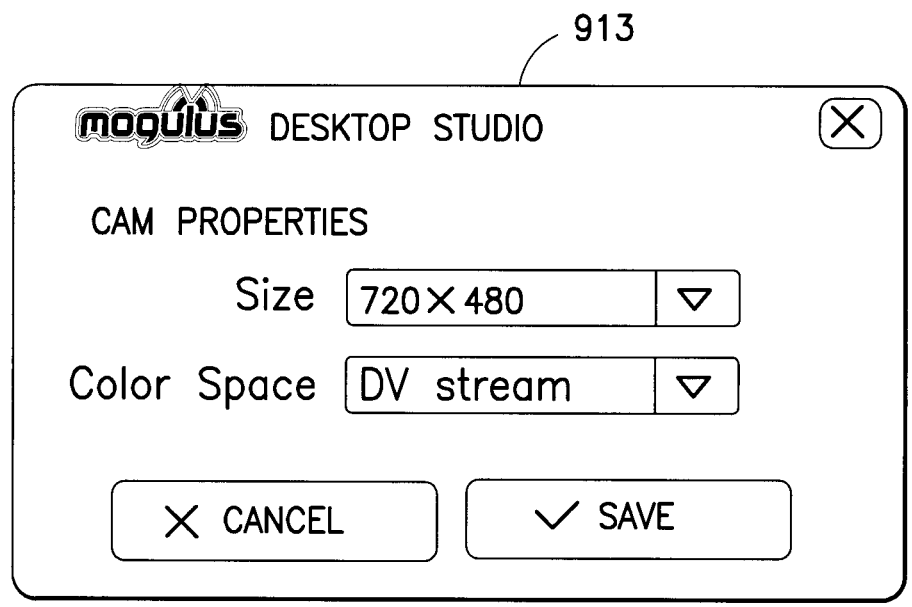

Referring now to FIGS. 9A-9G, these Figs. show example screenshots for an application according to an embodiment of the present invention (in this example, for Windows XP/Vista). More particularly, GUI 901 of FIG. 9A shows an example log-in dialog box, GUI 903 of FIG. 9B shows an example progress dialog box, GUI 905 of FIG. 9C shows an example settings dialog box, GUI 907 of FIG. 9D shows an example control dialog box, GUI 909 of FIG. 9E shows another example settings dialog box, GUI 911 of FIG. 9F shows another example settings dialog box and GUI 913 of FIG. 9G shows another example settings dialog box.

Reference will now be made to another detailed example of an implementation according to an embodiment of the present invention. In this case, the functionality may include (but not be limited to) one or more of:

Live video capture from:
Desktop
Camera (DV and/or webcam)
Game application
3D effects engine
dual screen mode
3d transitions
Live Encoding to
On2 Live Directshow SDK
FLV1
Render Window
Other Functionality
Desktop audio recording
Text overlay insertion for games
Desktop image capture
Asynchronous upload manager
Live recording to file
Editing of video files
URL capture from web browser In other examples, embodiments of the present invention may provide for desktop applications (e.g., written in C++ and/or Objective-C) for OSX (Mac) and/or for Windows XP/Vista.

In other examples, embodiments of the present invention may provide to each end user a binary installer file for either OSX or Windows XP/Vista which installs the software.

Figure 10:
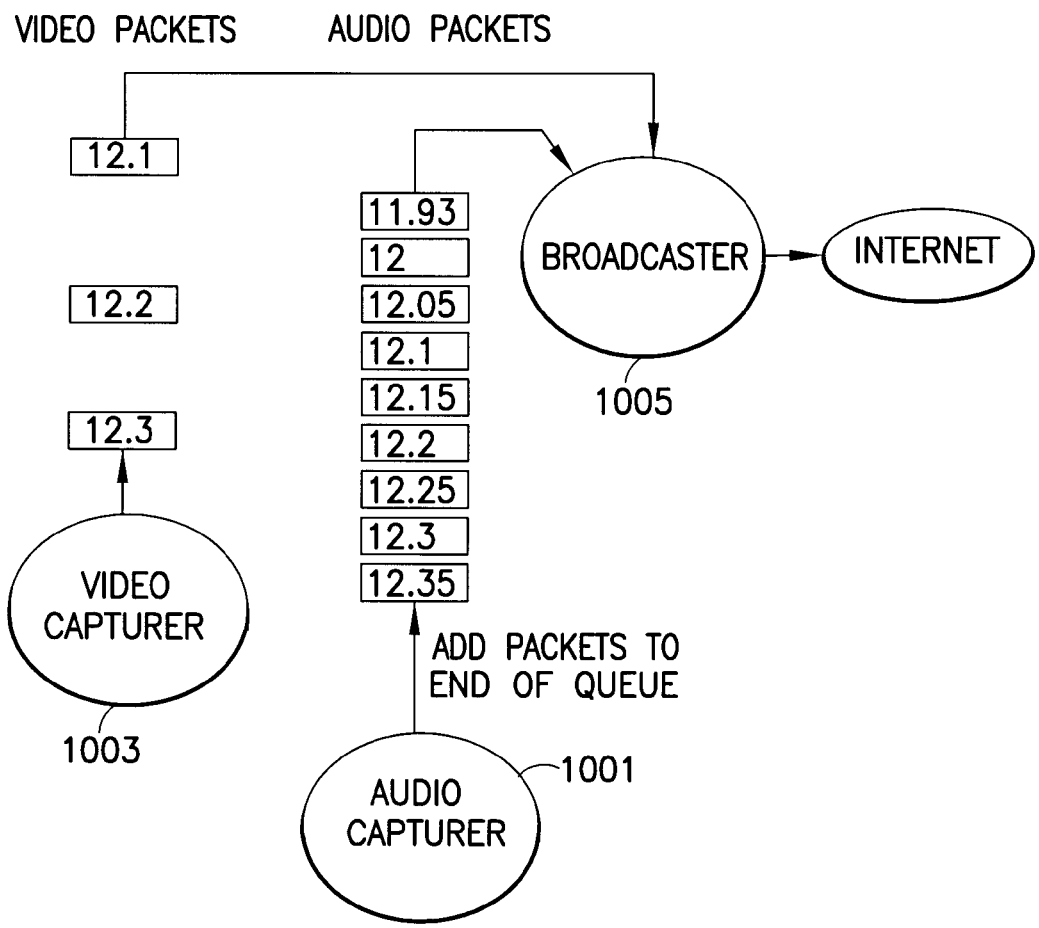
FIG. 10 shows a block diagram related primarily to video/audio packets according to another embodiment of the present invention.

Reference will now be made to another detailed example of an implementation according to an embodiment of the present invention. In this case, the technical specifications may include (but not be limited to) one or more of:

Package description:
  In one example, a C++ application that captures video from digital cameras, desktop and/or PC games and records it locally and/or broadcasts it using standard encoders.
Embedded:
  In one example, the application may include an interface with open source packages and other algorithms available in the public domain. Packages may include (but not be limited to) one or more of the following:
    FFMPEG: Audio/video encoder for fly, mp4 (h264) formats
    CxImage: Image processing package FMOD: Audio and video editor
ZLib: compression utility
Taxi: game capture utility
Boost: code utilities
WTL8: code utilities
LAME: MP3 encoder
Dependencies:
In one example, the application may be dependent on one or more of the following systems, packages and protocols in order to be developed and run (including, but not limited to):
Run time:
  Windows Vista Operating System and its included libraries including, but not limited to: DirectX, DirectShow, COM and others or Mac OSX and its included libraries including, but not limited to: AppKit, AudioToolbox, AudioUnit, Carbon, Cocoa, CoreAudio, CoreAudioKit, CoreData, Foundation, OpenGL, QTKit, QuartzCore, QuickTime and others
  Wowza server for receiving internet broadcasts; Flash Media Server for receiving internet broadcasts
In one example, the application may include and be dependent upon one or more of the following protocols (including, but not limited to):
Nelly moser
MP3
RTMP
H264
FLV1
On2
OpenGL
In one example, development packages may include (but not be limited to) one or more of the following:
Advanced Installer
Visual C++
Objective C
STL
Turtoise
In one example, various packages and/or sub-packages may include (but not be limited to) one or more of:
  One package/sub-package to record, edit and/or broadcast captured desktop screens, URLs and camera.
  One package/sub-package to record and/or broadcast captured games
In one example, one code line (that is, one set of code) may encapsulate the two packages/sub-packages mentioned above Reference will now be made to an example of interleaving (or mixing) audio and video. Under this example, there are three main components (modules) that are involved:

(1) Audio capturer (see, e.g., audio capturer module 1001 of FIG. 10), the module that captures the audio from the external or internal audio device. This audio capturer module interfaces with an audio device driver, captures the audio and outputs the audio as "audio packet" data. In this example, the number of audio packets and their size is related to the capturing frequency and requested quality.

(2) Video capturer (see, e.g., video capturer module 1003 of FIG. 10), the module that captures the video from the screen or camera. This video capturer module interfaces with the screen driver, captures the screen images, and outputs the video as "video packet" data. In this example, the number of video packets and their size is related to the capturing frequency and screen size.

(3) Broadcaster (see, e.g., broadcaster module 1005 of FIG. 10) is the module that receives the audio and video packets, interleaves (or mixes) the audio and video packets together, and broadcasts the interleaved audio and video packets as data packets (e.g., over the Internet). In this example, the format of the data packets and their order are defined by the desired broadcasting protocol (e.g., RTMP, RTP, proprietary).

Still referring to this example, the interleaving (or mixing) may be carried out iteratively at each of a plurality of time steps. In this example, at each time step the various modules perform processing as follows:

1. Audio capturer (see FIG. 10):
  a. Capture audio packet (using a process/mechanism described elsewhere herein)
  b. Timestamp the packet
  c. Add packet to a queue
  d. Add packet length (in time units) to an audio time length variable
2. Video capturer (see FIG. 10):
  a. Capture video packet (using a process/mechanism described elsewhere herein)
  b. Timestamp the packet
  c. Add packet to a queue
3. Broadcaster (algorithm example 1—see FIG. 10):
  a. Take first and second video packet
  b. Encode video packets
  c. Send first video packet
  d. Loop on audio packets queue from less recent to most recent. For every audio packet:
    i. encode audio packet
    ii. If first_video_packet.timestamp−audio_packet.timestamp>epsilon then discard audio packet (since audio packet is too old)
    iii. If second_video_packet.timestamp>audio_packet.timestamp then send audio packet (in this example, epsilon for bullet points ii. and iii. is defined empirically, and would typically be around 100 ms)
    iv. send remaining audio packets and video packet In another example variant on the interleaving (or mixing) algorithm, the Broadcaster may operate as follows:

3. Broadcaster (algorithm example 2—see FIG. 10)
  a. Take first and second video packet
  b. Encode video packets
  c. Send first video packet
  d. If |first_video_packet.timestamp−second_video_packet.timestamp|>audio time length variable then
    i. Loop on all audio packets. Expand each audio packet by |first_video_packet.timestamp−second_video_packet.timestamp|/(audio time length)
  e. If |first_video_packet.timestamp−second_video_packet.timestamp|<audio time length variable then
    i. Loop on all audio packets. Shrink each audio packet by (audio time length)/|first_video_packet.timestamp−second video_packet.timestamp|
  f. send audio packets and video packet In this example, shrinking audio packets is done by:
1. Loop on all bytes in audio packet
2. delete every X byte, where X is (audio time length)/|first_video_packet.timestamp−second_video_packet.timestamp|

In this example, expanding audio packets is done by:
1. Loop on all bytes in audio packet
2. duplicate every X byte, where X is |first_video_packet.timestamp−second video_packet.timestamp|/(audio time length)

In another example, packets may be taken from the front of the queue(s) and input into the interleaving algorithm.

Referring now to another embodiment of the present invention a system for live broadcasting video information from a sender computer to a receiver computer via at least one server computer operative on a network is provided, comprising: desktop software stored on a computer readable medium, wherein the desktop software is operative on the sender computer (see, e.g., one of sender computers $1201_1$-$1201_n$ of FIG. 12), wherein the desktop software: (1) obtains from the sender computer a plurality of video packets of live video information corresponding to a series of images shown on a screen of the sender computer; and (2) provides the plurality of video packets to a network connection associated with the sender computer for broadcast via the network (see, e.g., Internet 1212 of FIG. 12 and/or Intranet 1209 of FIG. 12); wherein the plurality of video packets provided to the network connection comprise: (a) a zoomed-in version of the series of images shown on the screen of the sender computer when a user of the sender computer indicates to the desktop software to provide the zoomed-in version of the series of images shown on the screen of the sender computer; and (b) a non-zoomed-in version of the series of images shown on the screen of the sender computer when the user of the sender computer does not indicate to the desktop software to provide the zoomed-in version of the series of images shown on the screen of the sender computer; and server software stored on a computer readable medium, wherein the server software is operative on the server computer (see, e.g., one or more of server computers $1203_1$-$1203_n$ of FIG. 12), wherein the server software: (1) receives the plurality of video packets broadcast from the network connection of the sender computer; and (2) broadcasts, via the network (see, e.g., Internet 1212 of FIG. 12 and/or Intranet 1211 of FIG. 12), to the receiver computer (see, e.g., one of receiver computers $1205_1$-$1205_n$ of FIG. 12) video information corresponding to the plurality of video packets received by the server computer.

In one example, the steps carried out by the desktop software may be carried out in the order recited.

In another example, the steps carried out by the desktop software may be carried out in another order (e.g., any desired order).

In another example, the steps carried out by the server software may be carried out in the order recited.

In another example, the steps carried out by the server software may be carried out in another order (e.g., any desired order).

In another example, any desired number of server computers (one or more) may be utilized.

Figure 12:
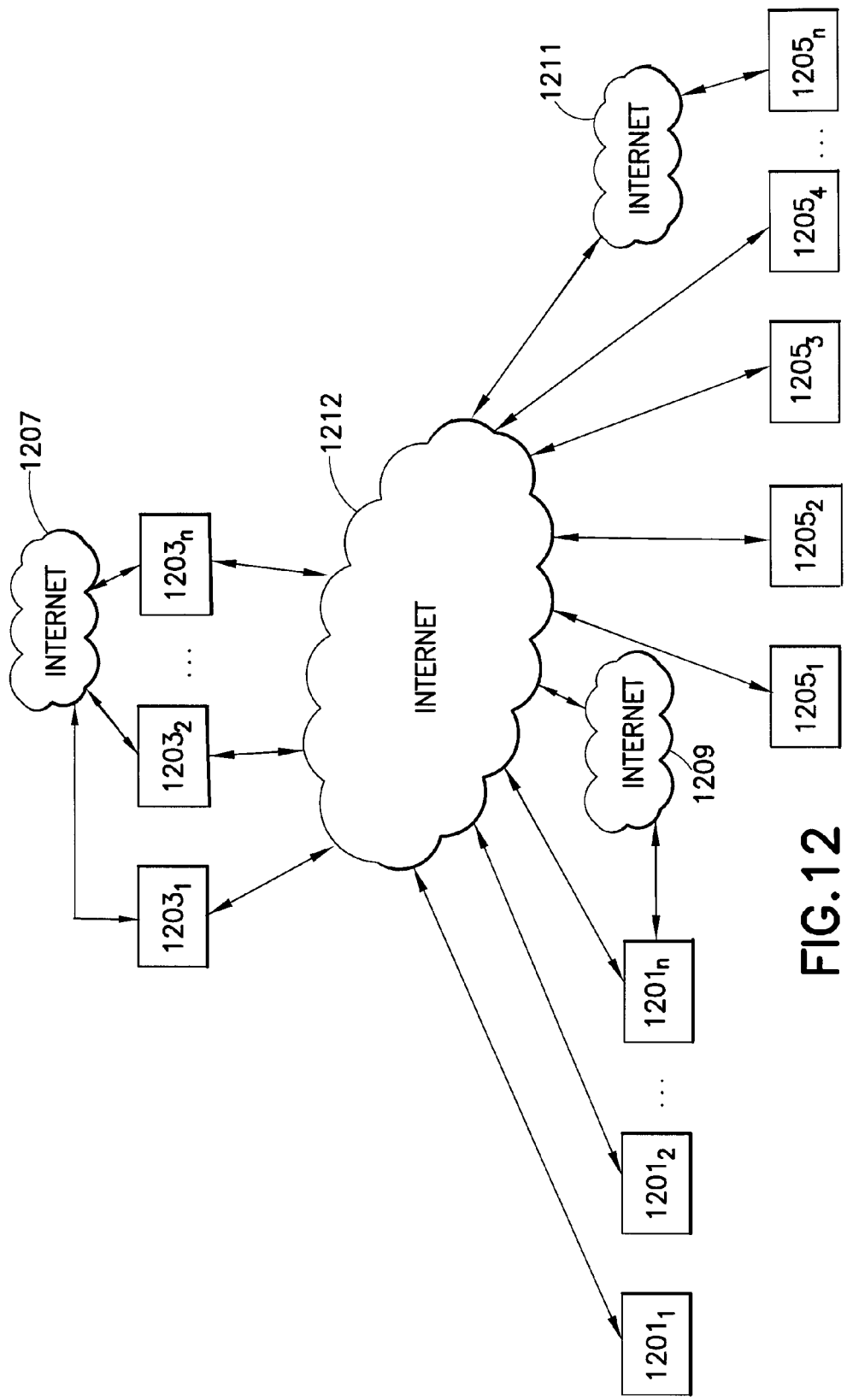
FIG. 12 shows a block diagram of a system according to another embodiment of the present invention.

In another example, one or more server computers may communicate with each other via the Internet (see, e.g., Internet 1212 of FIG. 12) and/or via one or more intranets (see, e.g., intranet 1207 of FIG. 12).

In another example, any desired number of sender computers (one or more) may be utilized.

In another example, any desired number of receiver computers (one or more) may be utilized.

In another example, the network may comprise at least one of (but not limited to): (a) the Internet; and (b) an intranet.

In an another example, the network communication between one or more sender computers and one or more server computers may comprise the Internet and/or an intranet.

In an another example, the network communication between one or more receiver computers and one or more server computers may comprise the Internet and/or an intranet.

In another example, one or more receiver computers may communicate with one or more server computers using a web browser.

In another example, a sender user using the desktop software may log-in (see, e.g., the log-in dialog 901 shown in the example of FIG. 9A).

In another example, a receiving user using a receiver computer may log-in.

In another example, a server computer may provide to a receiver computer the requested non-zoomed-in and/or non-zoomed-in version of the series of images shown on the screen of the sender computer.

In one example, the zooming-in (and/or zooming-out) may be done by the desktop software and/or by the server software.

In another example, a computer may dynamically send (e.g., under user control) various levels of zoom centered at various positions.

In another example, the live video information corresponding to the series of images shown on the screen of the sender computer may comprise at least one of (but not be limited to): (a) a computer desktop (e.g., associated with the sender computer); (b) a computer application (e.g., associated with the sender computer); (c) a computer game (e.g., associated with the sender computer); and (d) a feed from a camera (e.g., associated with the sender computer).

In another example, the camera may comprise a webcam (e.g., with a microphone).

In another example, the desktop software may further: (3) obtain from the sender computer a plurality of audio packets of live audio information corresponding to the series of images shown on the screen of the sender computer; and (4) provide the plurality of audio packets to the network connection associated with the sender computer for broadcast via the network; and the server software may further: (5) receive the plurality of audio packets broadcast from the network connection of the sender computer; and (6) broadcast, via the network, to the receiver computer audio information corresponding to the plurality of audio packets received by the server computer.

In another example, the video and audio packets may be correlated.

In another example, the desktop software may comprise one or more software modules.

In another example, the server software may comprise one or more software modules.

In another example, the computer readable medium upon which each of the desktop software and the server software is stored may be of the same type.

In another example, the computer readable medium upon which each of the desktop software and the server software is stored may be of a different type.

In another example, the computer readable medium upon which desktop software is stored may comprise a disc drive (e.g., magnetic or optical) associated with a sender computer.

In another example, the computer readable medium upon which server software is stored may comprise a disc drive (e.g., magnetic or optical) associated with a server computer.

As required, one or more video and/or audio packets may be dropped as sender computer speed, server computer speed, receiver computer speed and/or network speed dictates.

In another embodiment of the present invention a system for live broadcasting video information from at least one sender computer to at least one receiver computer via at least one server computer operative on a network is provided, comprising: first desktop software stored on a computer readable medium, wherein the first desktop software is operative on a first sender computer, wherein the first desktop software: (1) obtains from the first sender computer (see, e.g., one of sender computers $1201_1$-$1201_n$ of FIG. 12) a plurality of packets of live video information corresponding to a series of images shown on a screen of the first sender computer; and (2) provides the plurality of video packets to a network connection associated with the first sender computer for broadcast via the network (see, e.g., Internet 1212 of FIG. 12 and/or Intranet 1209 of FIG. 12), wherein the plurality of video packets provided to the network connection associated with the first sender computer comprise: (a) a zoomed-in version of the series of images shown on the screen of the first sender computer when a user of the first sender computer indicates to the first desktop software to provide the zoomed-in version of the series of images shown on the screen of the first sender computer; and (b) a non-zoomed-in version of the series of images shown on the screen of the first sender computer when the user of the first sender computer does not indicate to the first desktop software to provide the zoomed-in version of the series of images shown on the screen of the first sender computer; second desktop software stored on a computer readable medium, wherein the second desktop software is operative on a second sender computer (see, e.g., one of sender computers $1201_1$-$1201_n$ of FIG. 12), wherein the second desktop software: (1) obtains from the second sender computer a plurality of packets of live video information corresponding to a series of images shown on a screen of the second sender computer; and (2) provides the plurality of video packets to a network connection associated with the second sender computer for broadcast via the network (see, e.g., Internet 1212 of FIG. 12 and/or Intranet 1209 of FIG. 12), wherein the plurality of video packets provided to the network connection associated with the second sender computer comprise: (a) a zoomed-in version of the series of images shown on the screen of the second sender computer when a user of the second sender computer indicates to the second desktop software to provide the zoomed-in version of the series of images shown on the screen of the second sender computer; and (b) a non-zoomed-in version of the series of images shown on the screen of the second sender computer when the user of the second sender computer does not indicate to the second desktop software to provide the zoomed-in version of the series of images shown on the screen of the second sender computer; server software stored on a computer readable medium, wherein the server software is operative on the server computer (see, e.g., one or more of server computers $1203_1$-$1203_n$ of FIG. 12), wherein the server software: (1) receives the plurality of video packets broadcast from the network connection of the first sender computer; (2) receives the plurality of video packets broadcast from the network connection of the second sender computer; (3) receives via the network (see, e.g., Internet 1212 of FIG. 12 and/or Intranet 1211 of FIG. 12), from a first receiver computer (see, e.g., one of receiver computers $1205_1$-$1205_n$ of FIG. 12), a first channel instruction; and (4) in response to the first channel instruction broadcasts, via the network (see, e.g., Internet 1212 of FIG. 12 and/or Intranet 1211 of FIG. 12), to the first receiver computer video information corresponding to either: (a) the plurality of video packets received by the server computer that are associated with the first sender computer; or (b) the plurality of video packets received by the server computer that are associated with the second sender computer.

In one example, the channel instruction from the first receiver computer may be based upon a selection made by a user of the first receiver computer from a choice of channels provided by the server computer to the first receiver computer.

In another example, the choice of channels provided by the server computer to the first receiver computer may comprise at least a first indicia corresponding to the first sender computer and at least a second indicia corresponding to the second sender computer.

In another example, the choice of channels provided by the server computer to the first receiver computer may comprise at least a first indicia corresponding to a user of the first sender computer and at least a second indicia corresponding to a user of the second sender computer.

In another example, the server software may further: (7) receive via the network, from a second receiver computer, a second channel instruction; (8) in response to the second channel instruction broadcast, via the network, to the second receiver computer video information corresponding to either: (a) the plurality of video packets received by the server computer that are associated with the first sender computer; or (b) the plurality of video packets received by the server computer that are associated with the second sender computer;

In another example, any given receiver computer may dynamical change channels (that is, view/hear information associated with any selected sender computer).

In another example, a server computer may provide identification information regarding one or more sender computers to one or more receiver computers to permit any given receiver computer to dynamical change channels (that is, view/hear information associated with any selected sender computer).

In another example, information from any given sender computer may be viewed/heard by a user of any given receiver computer in a one-to-one relationship (one sender computer, one receiver computer)

In another example, information from any given sender computer may be viewed/heard by a user of any given receiver computer in a one-to-many relationship (one sender computer many receiver computers; or many sender computers, one receiver computer).

In another example, the live video information corresponding to the series of images shown on the screen of the first sender computer may comprise at least one of (but not be limited to): (a) a computer desktop (associated with the first sender computer); (b) a computer application (associated with the first sender computer); (c) a computer game (associated with the first sender computer); and (d) a feed from a camera (associated with the first sender computer) and the live video information corresponding to the series of images shown on the screen of the second sender computer may comprise at least one of (but not limited to): (a) a computer desktop (associated with the second sender computer); (b) a computer application (associated with the second sender computer); (c) a computer game (associated with the second sender computer); and (d) a feed from a camera (associated with the second sender computer).

In another example, the camera may comprise a webcam (e.g. with a microphone).

In another example, the first desktop software may further: (3) obtain from the first sender computer a plurality of packets of live audio information corresponding to the series of images shown on the screen of the first sender computer; and (4) provide the plurality of audio packets to the network connection associated with the first sender computer for broadcast via the network; the second desktop software may further: (3) obtain from the second sender computer a plurality of packets of live audio information corresponding to the series of images shown on the screen of the second sender computer; and (4) provide the plurality of audio packets to the network connection associated with the second sender computer for broadcast via the network; the server software may further: (7) receive the plurality of audio packets broadcast from the network connection of the first sender computer; (8) receive the plurality of audio packets broadcast from the network connection of the second sender computer; (9) in response to the first channel instruction broadcast, via the network, to the first receiver computer audio information corresponding to either: (a) the plurality of audio packets received by the server computer that are associated with the first sender computer; or (b) the plurality of audio packets received by the server computer that are associated with the second sender computer; and (10) in response to the second channel instruction broadcast, via the network, to the second receiver computer audio information corresponding to either: (a) the plurality of audio packets received by the server computer that are associated with the first sender computer; or (b) the plurality of audio packets received by the server computer that are associated with the second sender computer.

In another example, the video and audio packets may be correlated (e.g., with each other and across sender/receiver computers).

In another example, the first desktop software may be the same as the second desktop software.

In another example, the first desktop software may be the different from the second desktop software.

In another example, a server computer may provide to a receiver computer the requested zoomed-in and/or non-zoomed-in version of the series of images shown on the screen of the sender computer.

In one example, the zooming-in (and/or zooming-out) may be done by the desktop software and/or by the server software.

In another example, a computer may dynamically send (e.g., under user control) various levels of zoom centered at various positions.

In another embodiment of the present invention a system for live broadcasting video information from a sender computer to a receiver computer via at least one server computer operative on a network is provided, comprising: desktop software stored on a computer readable medium, wherein the desktop software is operative on the sender computer (see, e.g., one of sender computers $1201_1$-$1201_n$ of FIG. 12), wherein the desktop software: (1) obtains from the sender computer a plurality of packets of live video information corresponding to a series of images shown on a screen of the sender computer; (2) obtains from the sender computer a plurality of packets of live video information corresponding to a series of images from a camera; (3) converts the plurality of packets of live video information corresponding to the series of images shown on the screen and the plurality of packets of live video information corresponding to the series of images from the camera into a single composite video stream in the form of a series of video packets; and (4) provides the series of video packets to a network connection associated with the sender computer for broadcast via the network (see, e.g., Internet 1212 of FIG. 12 and/or Intranet 1209 of FIG. 12); and server software stored on a computer readable medium, wherein the server software is operative on the server computer (see, e.g., one or more of server computers $1203_1$-$1203_n$ of FIG. 12), wherein the server software: (1) receives the series of video packets broadcast from the network connection of the sender computer; and (2) broadcasts, via the network (see, e.g., Internet 1212 of FIG. 12 and/or Intranet 1211 of FIG. 12), to the receiver computer (see, e.g., one of receiver computers $1205_1$-$1205_n$ of FIG. 12), video information corresponding to the series of video packets received by the server computer (see, e.g., FIG. 7A showing a receiver computer view of a broadcast single composite video stream 701 comprising live video information corresponding to a series of images shown on a screen of a sender computer 703 and live video information corresponding to a series of images from a camera associated with the sender computer 705; see also, e.g., FIG. 7B showing a receiver computer view of a broadcast single composite video stream 711 comprising live video information corresponding to a series of images shown on a screen of a sender computer 713 and live video information corresponding to a series of images from a camera associated with the sender computer 715; see also, e.g., FIG. 8A showing a receiver computer view of a broadcast single composite video stream 801 comprising live video information corresponding to a series of images shown on a screen of a sender computer 803 and live video information corresponding to a series of images from a camera associated with the sender computer 805; see also, e.g., FIG. 8B showing a receiver computer view of broadcast single composite video stream 811 comprising live video information corresponding to a series of images shown on a screen of a sender computer 813 and live video information corresponding to a series of images from a camera associated with the sender computer 815).

In one example, the network may comprise at least one of: (a) the Internet; and (b) an intranet.

In another example, a receiver computer may communicate with a server computer using a web browser.

In another example, the live video information corresponding to the series of images shown on the screen of the sender computer may comprise at least one of (but not be limited to): (a) a computer desktop (associated with the sender computer); (b) a computer application (associated with the sender computer); (c) a computer game (associated with the sender computer); and (d) a feed from a camera (associated with the sender computer).

In another example, the camera may comprise a webcam (e.g., with a microphone).

In another example, the desktop software may further: (5) obtain from the sender computer a plurality of packets of live audio information corresponding to the series of images shown on the screen of the sender computer; and (6) provide the plurality of audio packets to the network connection associated with the sender computer for broadcast via the network; and the server software may further: (3) receive the plurality of audio packets broadcast from the network connection of the sender computer; and (2) broadcast, via the network, to the receiver computer audio information corresponding to the plurality of audio packets received by the server computer.

In another example, the video and audio packets may be correlated (e.g., with each other, across screen and camera and across sender/receiver computers).

In another example, the desktop software may further: (5) obtain from the sender computer a plurality of packets of live audio information corresponding to the series of images from the camera; and (6) provide the plurality of audio packets to the network connection associated with the sender computer for broadcast via the network; and the server software may further: (3) receive the plurality of audio packets broadcast from the network connection of the sender computer; and (2) broadcast, via the network, to the receiver computer audio information corresponding to the plurality of audio packets received by the server computer.

In another example, the video and audio packets may be correlated (e.g., with each other, across screen and camera and across sender/receiver computers).

In another embodiment of the present invention a system for live broadcasting video information from at least one sender computer to at least one receiver computer via at least one server computer operative on a network is provided, comprising: first desktop software stored on a computer readable medium, wherein the first desktop software is operative on a first sender computer (see, e.g., one of sender computers $1201_1$-$1201_n$ of FIG. 12), wherein the first desktop software: (1) obtains from the first sender computer a plurality of packets of live video information corresponding to a series of images shown on a screen of the first sender computer; (2) obtains from the first sender computer a plurality of packets of live video information corresponding to a series of images from a camera associated with the first sender computer; (3) converts the plurality of packets of live video information corresponding to the series of images shown on the screen of the first sender computer and the plurality of packets of live video information corresponding to the series of images from the camera associated with the first sender computer into a single composite video stream in the form of a series of video packets; and (4) provides the series of video packets to a network connection associated with the first sender computer for broadcast via the network (see, e.g., Internet 1212 of FIG. 12 and/or Intranet 1209 of FIG. 12); second desktop software stored on a computer readable medium, wherein the second desktop software is operative on a second sender computer (see, e.g., one of sender computers $1201_1$-$1201_n$ of FIG. 12), wherein the second desktop software: (1) obtains from the second sender computer a plurality of packets of live video information corresponding to a series of images shown on a screen of the second sender computer; (2) obtains from the second sender computer a plurality of packets of live video information corresponding to a series of images from a camera associated with the second sender computer; (3) converts the plurality of packets of live video information corresponding to the series of images shown on the screen of the second sender computer and the plurality of packets of live video information corresponding to the series of images from the camera associated with the second sender computer into a single composite video stream in the form of a series of video packets; and (4) provides the series of video packets to a network connection associated with the second sender computer for broadcast via the network (see, e.g., Internet 1212 of FIG. 12 and/or Intranet 1209 of FIG. 12); and server software stored on a computer readable medium, wherein the server software is operative on the server computer (see, e.g., one or more of server computers $1203_1$-$1203_n$ of FIG. 12), wherein the server software: (1) receives the series of video packets broadcast from the network connection of the first sender computer; (2) receives the series of video packets broadcast from the network connection of the second sender computer; (3) receives via the network (see, e.g., Internet 1212 of FIG. 12 and/or Intranet 1211 of FIG. 12), from a first receiver computer (see, e.g., one of receiver computers $1205_1$-$1205_n$ of FIG. 12), a first channel instruction; and (4) in response to the first channel instruction broadcasts, via the network (see, e.g., Internet 1212 of FIG. 12 and/or Intranet 1211 of FIG. 12), to the first receiver computer video information corresponding to either: (a) the series of video packets received by the server computer that are associated with the first sender computer; or (b) the series of video packets received by the server computer that are associated with the second sender computer.

In one example, the first channel instruction from the first receiver computer may be based upon a selection made by a user of the first receiver computer from a choice of channels provided by the server computer to the first receiver computer.

In another example, the choice of channels provided by the server computer to the first receiver computer may comprise at least a first indicia corresponding to the first sender computer and at least a second indicia corresponding to the second sender computer.

In another example, the choice of channels provided by the server computer to the first receiver computer may comprise at least a first indicia corresponding to the a user of the first sender computer and at least a second indicia corresponding to a user of the second sender computer.

In another example, the server software may further: (5) receive via the network, from a second receiver computer, a second channel instruction; (6) in response to the second channel instruction broadcast, via the network, to the second receiver computer video information corresponding to either: (a) the series of video packets received by the server computer that are associated with the first sender computer; or (b) the series of video packets received by the server computer that are associated with the second sender computer;

In another example the network may comprise at least one of: (a) the Internet; and (b) an intranet.

In another example, the first receiver computer may communicate with the server computer using a web browser.

In another example, the live video information corresponding to the series of images shown on the screen of the first sender computer may comprise at least one of: (a) a computer desktop (associated with the first sender computer); (b) a computer application (associated with the first sender computer); (c) a computer game (associated with the first sender computer); and (d) a feed from a camera (associated with the first sender computer) and the live video information corresponding to the series of images shown on the screen of the second sender computer may comprise at least one of: (a) a computer desktop (associated with the second sender computer); (b) a computer application (associated with the second sender computer); (c) a computer game (associated with the second sender computer); and (d) a feed from a camera (associated with the second sender computer).

In another example, the camera may comprise a webcam (e.g., with a microphone).

In another example, the first desktop software may further: (5) obtain from the first sender computer a plurality of packets of live audio information corresponding to the series of images shown on the screen of the first sender computer; and (6) provide the plurality of audio packets associated with the first sender computer to the network connection associated with the first sender computer for broadcast via the network; the server software may further: (4) receive the plurality of audio packets broadcast from the network connection of the first sender computer; and (5) broadcast, via the network, to the first receiver computer audio information corresponding to the plurality of audio packets associated with the first sender computer received by the server computer.

In another example, the first desktop software may further: (5) obtain from the first sender computer a plurality of packets of live audio information corresponding to the series of images from the camera of the first sender computer; and (6) provide the plurality of audio packets associated with the first sender computer to the network connection associated with the first sender computer for broadcast via the network; the server software may further: (4) receive the plurality of audio packets broadcast from the network connection of the first sender computer; and (5) broadcast, via the network, to the first receiver computer audio information corresponding to the plurality of audio packets associated with the first sender computer received by the server computer.

In another embodiment of the present invention a system for live broadcasting video information from a sender computer is provided, comprising: a first software module (see, e.g., module 1101 of FIG. 11), wherein the first software module iteratively obtains from a screen buffer associated with the sender computer (e.g., via devices and/or capture cards 1100) a plurality of frames of video information shown on a screen of the sender computer and wherein the first software module iteratively places the plurality of frames in a first software module buffer (see, e.g., memory 1101A of FIG. 11); a second software module (see, e.g., 1103 of FIG. 11) that operatively communicates with the first software module buffer, wherein the second software module encodes the frames from the first software module buffer; and a broadcast software module that operatively communicates with the second software module, wherein the broadcast module broadcasts the frames using at least one Internet protocol.

In one example, the video information shown on a screen of the sender computer may correspond to one or more of (but not be limited to): (a) video associated with a computer desktop; (b) video associated with a computer application; (c) video associated with a computer game; and/or (d) video associated with a feed from a camera (e.g., a webcam).

In another example, the first software module may iteratively obtain directly from the screen buffer associated with the sender computer the plurality of frames of video information shown on the screen of the sender computer.

In another example, each of the first software module, the second software module and the broadcast software module may be separate from one another.

In another example, at least the first software module and the second software module may be combined.

In another example, at least the second software module and the broadcast software module may be combined.

In another example, each of the first software module, the second software module and the broadcast software module may be combined.

Figure 11:
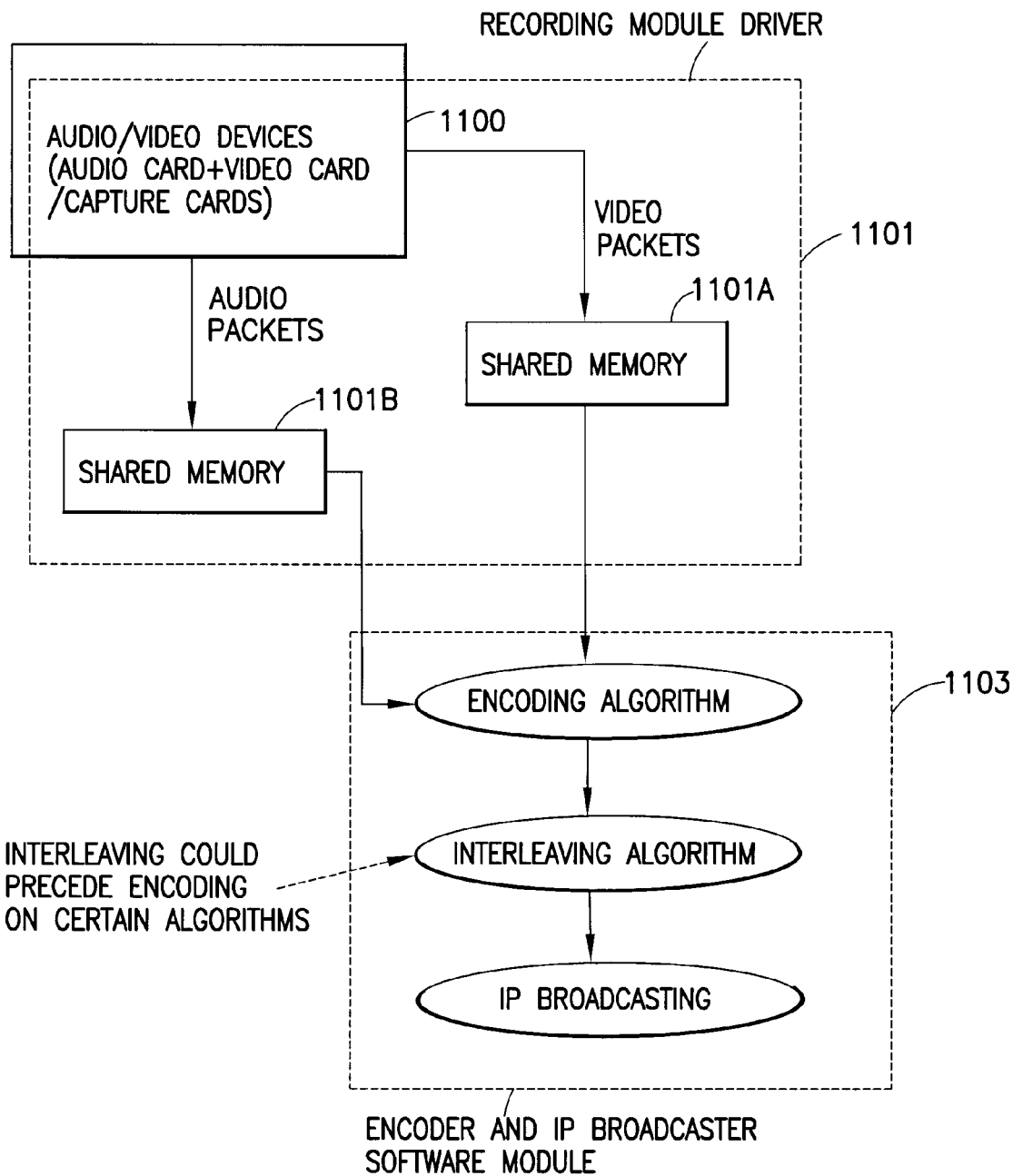
FIG. 11 shows a block diagram related to video/audio packets, memory, algorithms and various hardware/software according to another embodiment of the present invention.

In another example, audio packets may be placed in a buffer (see, e.g., memory 1101B of FIG. 11).

In another example, audio packets may be encoded and/or interleaved with video packets (see, e.g., FIG. 11).

In another example, the screen buffer may comprise a RAM memory.

In another example, the first software module buffer may comprise a RAM memory.

In another example, the screen buffer may comprise shared memory for the first software module and the second software module (see, e.g., FIG. 11).

In another embodiment of the present invention a method for live broadcasting video information from a sender computer may be provided, comprising: iteratively obtaining from a screen buffer associated with the sender computer a plurality of frames of video information shown on a screen of the sender computer; iteratively placing the plurality of frames in a software module buffer; encoding the frames from the software module buffer; and broadcasting the encoded frames using at least one Internet protocol.

In one example, the video information shown on a screen of the sender computer may correspond to one or more of (but not be limited to): (a) video associated with a computer desktop; (b) video associated with a computer application; (c) video associated with a computer game; and/or (d) video associated with a feed from a camera (e.g., a webcam).

In another example, the frames of video information shown on the screen of the sender computer may be iteratively obtained directly from the screen buffer associated with the sender computer.

In another example, the steps may be carried out in the order recited.

In another embodiment of the present invention a system for live broadcasting video information associated with a viewed computer screen from a sender computer is provided, comprising: a first software module (see, e.g., module 1101 of FIG. 11), wherein the first software module iteratively obtains from a capture device (e.g., via devices and/or capture cards 1100) associated with the sender computer a plurality of frames of video information shown on the screen of the viewed computer and wherein the first software module iteratively places the plurality of frames in a first software module buffer (see, e.g., memory 1101A of FIG. 11); a second software module see, e.g., 1103 of FIG. 11) that operatively communicates with the first software module buffer, wherein the second software module encodes the frames from the first software module buffer; and a broadcast software module that operatively communicates with the second software module, wherein the broadcast software module broadcasts the frames using at least one Internet protocol.

In one example, the video information shown on a screen of the sender computer may correspond to one or more of (but not be limited to): (a) video associated with a computer desktop; (b) video associated with a computer application; (c) video associated with a computer game; and/or (d) video associated with a feed from a camera (e.g., a webcam).

In another example, each of the first software module, the second software module and the broadcast software module may be separate from one another.

In another example, at least the first software module and the second software module may be combined.

In another example, at least the second software module and the broadcast software module may be combined.

In another example, each of the first software module, the second software module and the broadcast module may be combined.

In another embodiment of the present invention a method for live broadcasting video information associated with a viewed computer screen from a sender computer is provided, comprising: iteratively obtaining from a capture device associated with the sender computer a plurality of frames of video information shown on the screen of the viewed computer; iteratively placing the plurality of frames in a software module buffer; encoding the frames from the software module buffer; and broadcasting the encoded frames using at least one Internet protocol.

In one example, the video information shown on a screen of the sender computer may correspond to one or more of (but not be limited to): (a) video associated with a computer desktop; (b) video associated with a computer application; (c) video associated with a computer game; and/or (d) video associated with a feed from a camera (e.g., a webcam).

In another example, the steps may be carried out in the order recited.

Figure 13:
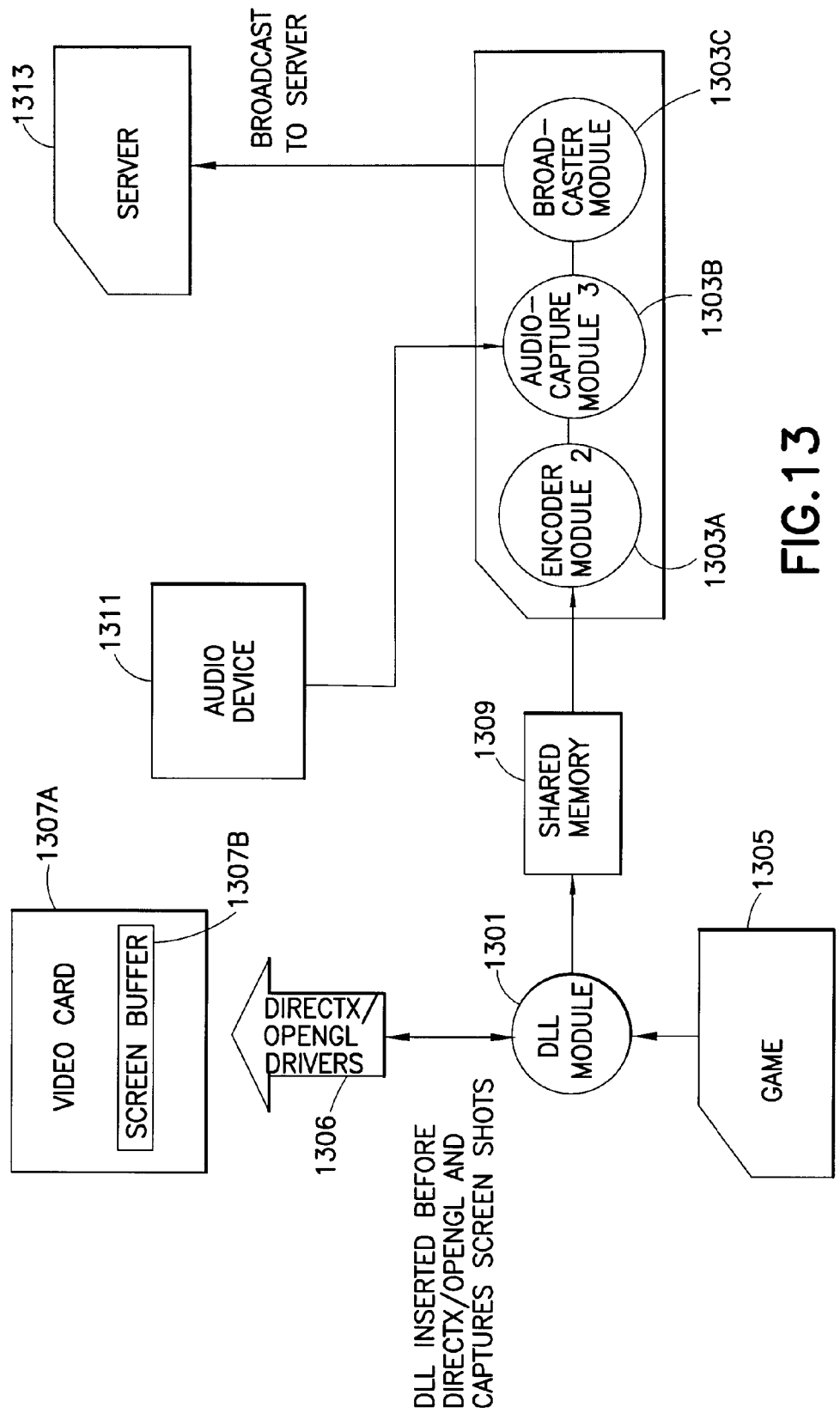
FIG. 13 shows a block diagram of a system according to another embodiment of the present invention.

Referring now to FIG. 13, another embodiment of the present invention is shown (as seen in this FIG. 13, this embodiment relates to game broadcasting using an application comprising a DLL and an EXE).

More particularly, a mechanism for game broadcasting according to this embodiment may be carried out as follows (of note, the motivation to do code insertion, as described in steps 4 and 5, is because using other methods of grabbing the screen can produce errors, like black screens, incomplete drawn screens and others, thus essentially rendering such other methods useless):

1. As mentioned above, the application according to this embodiment comprises an EXE and a DLL (see, e.g., DLL 1301 (sometimes referred to as "Hook DLL") and EXE 1303 of FIG. 13)
2. The DLL 1301 registers itself at the operating system to receive messages upon events happening at other programs (this is called hooking) Specifically, the DLL 1301 in this example will take action when:
   1. a window is created or receives focus and/or
   2. some keyboard keys are pressed (e.g., predefined keys combinations)
3. A game (see, e.g., Game 1305 of FIG. 13) starts, creates a window and this window receives focus
4. The Hook DLL 1301 is loaded into and called in the context of the game process memory space
5. When Hook DLL 1301 is called, Hook DLL 1301 identifies: (a) whether this is a game; and (2) what version of graphics engine (e.g., DirectX/OpenGL—see, e.g., DirectX/OpenGL drivers 1306)) does the game use. If it is a game with detectable graphics engine, Hook DLL 1301 inserts code that reroutes the main drawing methods function into the Hook DLL's own replacement method. In this example, the code insertion is done by the following sub-steps:
   1. The Hook DLL 1301 calculates the memory address of the main drawing methods of the graphics engine
   2. The Hook DLL 1301 replaces the first original bytes of each method with bytes that represent an instruction to jump to the DLL's own replacement method. This will reroute any executing program that reaches those bytes, to the Hook DLL's own replacement methods
   3. The Hook DLL's replacement method can now perform tasks like, for example, capturing the screen, presenting graphics and more (detailed below)
   4. The Hook DLL 1301 also would call the engine's original drawing method, so the functionality of the game will remain the same
6. The EXE 1303 opens a window with user interface elements (e.g., buttons) for Start/Stop broadcasting, and for settings configuration
7. The DLL 1301 presents some graphic user interface on the screen, layered on top of the game. The layered graphic user interface may include (but not be limited to), for example: company logo, statistics (e.g., frame rate, time), hot key instructions (e.g., "press Ctrl+F1 to start"), etc
8. When a predefined keys combination is pressed, or when the UI button is pressed to Start Broadcasting, the following starts to happen in a loop (the frequency of which depends (in this example) on the game frame rate and the game device capabilities):
   1. The DLL 1301:
      1. captures the video from the screen buffer (see, e.g., video card 1307A and screen buffer 1307B of FIG. 13),
      2. puts the captured video in a shared memory area (see, e.g., shared memory 1309 of FIG. 13)
      3. sends a notification to the EXE 1303
   2. The EXE 1303:
      1. grabs audio data from the audio card (see, e.g., audio device 1311 of FIG. 13)
      2. takes the screen from the shared memory buffer 1309 (video frame)
      3. compresses the video frame
      4. interleaves the audio and the video frame (in another example, the order of steps 3 and 4 (compress, interleave) may be interchanged)
9. When a key is pressed to Stop Broadcasting, all the above stops.

In another embodiment of the present invention a system for live broadcasting video information from a sender computer is provided, comprising: a first software module (see, e.g., DLL 1301 of FIG. 13), wherein the first software module is inserted into a memory space of a first process, wherein the first software module obtains a handle to a screen buffer (see, e.g., video card 1307A including screen buffer 1307B of FIG. 13) associated with the sender computer, wherein the first software module iteratively obtains a plurality of frames of video information shown on a screen of the sender computer and wherein the first software module iteratively places the obtained frames in a first software module buffer (see, e.g., shared memory 1309 of FIG. 13); a second software module (see, e.g., encoder—module number two 1303A of FIG. 13) that resides inside a second process, and that operatively communicates with the first software module buffer, wherein the second software module encodes the frames from the first software module buffer; a third software module (see, e.g., audio capture—module number three 1303B of FIG. 13), wherein the third software module obtains a plurality of audio frames from an audio device (see, e.g., audio device 1311 of FIG. 13) of the sender computer; and a broadcast software module (see, e.g., broadcaster module 1303C of FIG. 13) that operatively communicates with the second and third software modules, wherein the broadcast module interleaves the video and audio frames from the second software module and the third software module and broadcasts the interleaved frames using at least one Internet protocol, wherein the first process is distinct from the second process. In one example, the broadcast may be via the Internet to server 1313. In another example, EXE 1303 may comprise encoder—module number two 1303A, audio capture—module number three 1303B and broadcaster module 1303C.

In another example, the first software module may iteratively obtain directly from the screen buffer associated with the sender computer the plurality of frames of video information shown on the screen of the sender computer.

In another example, the first software module may send text and/or graphics to the screen buffer.

In another example, each of the first software module, the second software module, the third software module and the broadcast software module may be separate from one another.

In another example, at least the first software module and the second software module may be combined.

In another example, at least the second software module and the broadcast software module may be combined.

In another example, at least the first software module, the second software module and the broadcast software module may be combined.

In another example, at least the first software module, the second software module, and the third software module may be combined.

In another example, at least the second software module, the third software module and the broadcast software module may be combined (see, e.g., FIG. 13 showing that EXE 1303 may comprise encoder—module number two 1303A, audio capture—module number three 1303B and broadcaster module 1303C).

In another example, at least the second software module and the third software module may be combined.

In another example, at least the third software module and the broadcast software module may be combined.

In another example, the first process may comprise a game.

In another embodiment of the present invention a method for live broadcasting from a sender computer video information associated with a viewed device screen is provided, comprising (see, e.g. FIG. 11): iteratively obtaining from at least one capture device 1100 associated with the sender computer a plurality of frames of video information shown on the screen of the viewed device and a plurality of frames of corresponding audio data; iteratively placing the obtained frames in software module buffers 1101A,1101B; encoding the frames from the software module buffers; interleaving the audio and the video frames; and broadcasting the encoded frames using at least one Internet protocol.

In another example, one capture device may be associated with video information and another capture device may be associated with audio data.

In another example, the steps may be carried out in the order recited.

As described herein, various embodiments of the present invention may enable simple/high quality live broadcasting from cameras, desktop and/or games.

Further, as described herein, various embodiments of the present invention may allow live broadcast of video games using the Internet and/or other broadcasting (e.g., digital broadcasting) methods.

Further, as described herein, various embodiments of the present invention may provide for: (1) Camera broadcasting (e.g., associated with one or more cameras); (2) Screen broadcasting (e.g., associated with one or more screens); and/or (3) Game broadcasting (e.g., associated with one or more games).

In another example, the software may be a desktop software product (e.g., such as marketed under the name PROCASTER).

In another example, the present invention may be used to reach a live audience in real-time (e.g., on the MOGULUS network).

In another example, the present invention may be implemented fully or partially using a FLASH-based technology.

In another embodiment of the present invention one or more video/audio streams may be recordable and/or archivable (various embodiments of the present invention do not necessarily exclude recording).

In another embodiment of the present invention any desired number of users may be provided for (e.g., any desired number of users operating sender computers and any desired number of users operating receiver computers).

In another embodiment of the present invention one or more spectators (e.g. using one or more receiver computers) may watch one or more game players (e.g., using one or more sender computers).

In another embodiment of the present invention, chat (e.g., in-game chat) may be provided.

As described herein, various embodiments of the present invention may provide for live mixing of audio and video (e.g. screen mixed with camera; game mixed with camera). In various examples, high performance may be provided and/or standard video technology may be utilized (e.g., standard audio and/or video encoders).

Further, certain embodiments of the present invention (e.g., zoom embodiments) may be achievable due at least in part to broadcasting (by sender computer and/or server computer) of frames as 2-D images.

Further, various embodiments of the present invention may be applied to use in association with one or more computers and/or one or more game devices (e.g., video game consoles).

In another embodiment of the present invention a system for live broadcasting video information from a sender computer to a receiver computer via at least one server computer operative on a network is provided, comprising: desktop software stored on a computer readable medium, wherein the desktop software is operative on the sender computer, wherein the desktop software: (1) obtains from the sender computer a plurality of video packets of live video information corresponding to a series of images shown on a screen of the sender computer; and (2) provides the plurality of video packets to a network connection associated with the sender computer for broadcast via the network; and server software stored on a computer readable medium, wherein the server software is operative on the server computer, wherein the server software: (1) receives the plurality of video packets broadcast from the network connection of the sender computer; (2) broadcasts, via the network, to the receiver computer video information corresponding to the plurality of video packets received by the server computer; (3) receives, via the network, at least a first zoom instruction from the receiver computer to provide to the receiver computer a zoomed-in version of the series of images shown on the screen of the sender computer; and (4) in response to the zoom instruction broadcasts, via the network, to the receiver computer the zoomed-in version of the series of images shown on the screen of the sender computer.

In one example, network may comprise at least one of: (a) the Internet; and (b) an intranet.

In another example, the receiver computer may communicate with the server computer using a web browser.

In another example, the server computer may receive from the receiver computer, after the receipt by the server computer of the first zoom instruction, a second zoom instruction, wherein the second zoom instruction comprises an instruction to provide to the receiver computer a non-zoomed-in version of the series of images shown on the screen of the sender computer.

In another example, the live video information corresponding to the series of images shown on the screen of the sender computer may comprise at least one of (but not be limited to): (a) a computer desktop; (b) a computer application; (c) a computer game; and (d) a feed from a camera.

In another example, the desktop software may further: (3) obtain from the sender computer a plurality of audio packets of live audio information corresponding to the series of images shown on the screen of the sender computer; and (4) provide the plurality of audio packets to the network connection associated with the sender computer for broadcast via the network; and the server software may further: (5) receive the plurality of audio packets broadcast from the network connection of the sender computer; and (6) broadcast, via the network, to the receiver computer audio information corresponding to the plurality of audio packets received by the server computer.

In another example, a server computer may receive from a receiver computer, after the receipt by the server computer of the first zoom instruction, a second zoom instruction, wherein the second instruction may comprise an instruction to provide to the receiver computer a non-zoomed-in version of the series of images shown on the screen of the sender computer.

In another example, and the server computer may, of course, respond with the instructed views.

In another embodiment, a system for live broadcasting video information from at least one sender computer to at least one receiver computer via at least one server computer operative on a network is provided, comprising: first desktop software stored on a computer readable medium, wherein the first desktop software is operative on a first sender computer, wherein the first desktop software: (1) obtains from the first sender computer a plurality of packets of live video information corresponding to a series of images shown on a screen of the first sender computer; and (2) provides the plurality of video packets to a network connection associated with the first sender computer for broadcast via the network; second desktop software stored on a computer readable medium, wherein the second desktop software is operative on a second sender computer, wherein the second desktop software: (1) obtains from the second sender computer a plurality of packets of live video information corresponding to a series of images shown on a screen of the second sender computer; and (2) provides the plurality of video packets to a network connection associated with the second sender computer for broadcast via the network; server software stored on a computer readable medium, wherein the server software is operative on the server computer, wherein the server software: (1) receives the plurality of video packets broadcast from the network connection of the first sender computer; (2) receives the plurality of video packets broadcast from the network connection of the second sender computer; (3) receives via the network, from a first receiver computer, a first channel instruction; (4) in response to the first channel instruction broadcasts, via the network, to the first receiver computer video information corresponding to either: (a) the plurality of video packets received by the server computer that are associated with the first sender computer; or (b) the plurality of video packets received by the server computer that are associated with the second sender computer; (5) receives, via the network, at least a first instruction from the first receiver computer to provide to the receiver computer a zoomed-in version of the series of images shown on the screen of the sender computer; and (6) in response to the instruction broadcasts, via the network, to the first receiver computer the zoomed-in version of the video information.

In one example, the first channel instruction from the first receiver computer may be based upon a selection made by a user of the first receiver computer from a choice of channels provided by the server computer to the first receiver computer.

In another example, the choice of channels provided by the server computer to the first receiver computer may comprise at least a first indicia corresponding to the first sender computer and at least a second indicia corresponding to the second sender computer.

In another example, the choice of channels provided by the server computer to the first receiver computer may comprise at least a first indicia corresponding to a user of the first sender computer and at least a second indicia corresponding to a user of the second sender computer.

In another example, the server software may further: (7) receive via the network, from a second receiver computer, a second channel instruction; (8) in response to the second channel instruction broadcast, via the network, to the second receiver computer video information corresponding to either: (a) the plurality of video packets received by the server computer that are associated with the first sender computer; or (b) the plurality of video packets received by the server computer that are associated with the second sender computer;

In another example, the network comprises at least one of: (a) the Internet; and (b) an intranet.

In another example, the first receiver computer may communicate with the server computer using a web browser.

In another example, the server computer may receive from the first receiver computer, after the receipt by the server computer of the first zoom instruction, a second zoom instruction, wherein the second zoom instruction comprises an instruction to provide to the first receiver computer a non-zoomed-in version of the series of images shown on the screen of the sender computer.

In another example, the server software may receive, via the network, at least a first zoom instruction from the second receiver computer to provide to the second receiver computer a zoomed-in version of the series of images shown on the screen of the second sender computer; and in response to the first zoom instruction may broadcast, via the network, to the second receiver computer the zoomed-in version of the video information.

In another example, the live video information corresponding to the series of images shown on the screen of the first sender computer comprises at least one of (but not be limited to): (a) a computer desktop; (b) a computer application; (c) a computer game; and (d) a feed from a camera and wherein the live video information corresponding to the series of images shown on the screen of the second sender computer comprises at least one of: (a) a computer desktop; (b) a computer application; (c) a computer game; and (d) a feed from a camera.

In another example, the first desktop software may further: (3) obtain from the first sender computer a plurality of packets of live audio information corresponding to the series of images shown on the screen of the first sender computer; and (4) provide the plurality of audio packets to the network connection associated with the first sender computer for broadcast via the network; the second desktop software may further: (3) obtain from the second sender computer a plurality of packets of live audio information corresponding to the series of images shown on the screen of the second sender computer; and (4) provide the plurality of audio packets to the network connection associated with the second sender computer for broadcast via the network; the server software may further: (9) receive the plurality of audio packets broadcast from the network connection of the first sender computer; (10) receive the plurality of audio packets broadcast from the network connection of the second sender computer; (11) in response to the first channel instruction broadcast, via the network, to the first receiver computer audio information corresponding to either: (a) the plurality of audio packets received by the server computer that are associated with the first sender computer; or (b) the plurality of audio packets received by the server computer that are associated with the second sender computer; and (12) in response to the second channel instruction broadcast, via the network, to the second receiver computer audio information corresponding to either: (a) the plurality of audio packets received by the server computer that are associated with the first sender computer; or (b) the plurality of audio packets received by the server computer that are associated with the second sender computer.

In another example, and the server computer may, of course, respond with the instructed views.

For the purposes of this disclosure, a computer readable medium is a medium that stores computer data/instructions in machine readable form. By way of example, and not limitation, a computer readable medium can comprise computer storage media as well as communication media, methods or signals. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to tangibly store the desired information and which can be accessed by the computer.

Further, the present invention may, of course, be implemented using any appropriate computer readable medium, computer hardware and/or computer software. In this regard, those of ordinary skill in the art are well versed in the type of computer hardware that may be used (e.g., one or more mainframes, one or more mini-computers, one or more personal computers ("PC"), one or more networks (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

Of course, any embodiment/example described herein (or any feature or features of any embodiment/example described herein) may be combined with any other embodiment/example described herein (or any feature or features of any such other embodiment/example described herein).

While a number of embodiments/examples of the present invention have been described, it is understood that these embodiments/examples are illustrative only, and not restrictive, and that many modifications may become apparent to those of ordinary skill in the art. For example, certain methods may be "computer implementable" or "computer implemented." In this regard, it is noted that while such methods can be implemented using a computer, the methods do not necessarily have to be implemented using a computer. Also, to the extent that such methods are implemented using a computer, not every step must necessarily be implemented using a computer. Further, any steps described herein may be carried out in any desired order (and any steps may be added and/or deleted).

What is claimed is:

1. A system for live broadcasting from a sender computer to a receiver computer via at least one server computer operative on a network, comprising:
    desktop software stored on a computer readable medium, wherein the desktop software is operative on the sender computer, wherein the desktop software:
    (1) obtains from the sender computer a plurality of video packets of live video information corresponding to a series of images shown on a screen of the sender computer, wherein the series of images corresponds to at least one computer game played by a user of the sender computer;
    (2) provides the plurality of video packets to a network connection associated with the sender computer for broadcast via the network, wherein the plurality of video packets provided to the network connection comprise: (a) a zoomed-in version of the series of images shown on the screen of the sender computer when the user of the sender computer indicates to the desktop software to provide the zoomed-in version of the series of images shown on the screen of the sender computer; and (b) a non-zoomed-in version of the series of images shown on the screen of the sender computer when the user of the sender computer does not indicate to the desktop software to provide the zoomed-in version of the series of images shown on the screen of the sender computer;
    (3) obtains from the sender computer a plurality of audio packets of live audio information, wherein the plurality of audio packets corresponds to: 1) the at least one computer game played by the user of the sender computer, 2) audio generated by the user, or 3) both; and
    (4) provides the plurality of audio packets to the network connection associated with the sender computer for broadcast via the network; and
    server software stored on a computer readable medium, wherein the server software is operative on the server computer, wherein the server software:
    (1) receives the plurality of video packets broadcast from the network connection of the sender computer;
    (2) broadcasts, via the network, to the receiver computer video information corresponding to the plurality of video packets received by the server computer;
    (3) receives the plurality of audio packets broadcast from the network connection of the sender computer; and
    (4) broadcasts, via the network, to the receiver computer audio information corresponding to the plurality of audio packets received by the server computer.

2. The system of claim 1, wherein the network comprises at least one of: (a) the Internet; and (b) an intranet.

3. The system of claim 1, wherein the receiver computer communicates with the server computer using a web browser.

4. The system of claim 1, wherein the live video information corresponding to the series of images shown on the screen of the sender computer further comprises a feed from a camera.

5. A system for live broadcasting from at least one sender computer to at least one receiver computer via at least one server computer operative on a network, comprising:
    first desktop software stored on a computer readable medium, wherein the first desktop software is operative on a first sender computer, wherein the first desktop software:
    (1) obtains from the first sender computer a first plurality of packets of first live video information corresponding to a first series of images shown on a screen of the first sender computer, wherein the first series of images corresponds to at least one first computer game played by a first user of the first sender computer;
    (2) provides the first plurality of video packets to a network connection associated with the first sender computer for broadcast via the network, wherein the first plurality of video packets provided to the network connection associated with the first sender computer comprise: (a) a zoomed-in version of the first series of images shown on the screen of the first sender computer when the first user of the first sender computer indicates to the first desktop software to provide the zoomed-in version of the first series of images shown on the screen of the first sender computer; and (b) a non-zoomed-in version of the first series of images shown on the screen of the first sender computer when the first user of the first sender computer does not indicate to the first desktop software to provide the zoomed-in version of the first series of images shown on the screen of the first sender computer;
    (3) obtains from the first sender computer a first plurality of audio packets of first live audio information, wherein the first plurality of audio packets corresponds to: 1) the at least one first computer game played by the first user of the first sender computer, 2) first audio generated by the first user, or 3) both; and
    (4) provides the first plurality of audio packets to the network connection associated with the first sender computer for broadcast via the network;

second desktop software stored on a computer readable medium, wherein the second desktop software is operative on a second sender computer, wherein the second desktop software:
(1) obtains from the second sender computer a second plurality of packets of second live video information corresponding to a second series of images shown on a screen of the second sender computer, wherein the second series of images corresponds to at least one second computer game played by a second user of the second sender computer;
(2) provides the second plurality of video packets to a network connection associated with the second sender computer for broadcast via the network, wherein the second plurality of video packets provided to the network connection associated with the second sender computer comprise: (a) a zoomed-in version of the second series of images shown on the screen of the second sender computer when the second user of the second sender computer indicates to the second desktop software to provide the zoomed-in version of the second series of images shown on the screen of the second sender computer; and (b) a non-zoomed-in version of the second series of images shown on the screen of the second sender computer when the second user of the second sender computer does not indicate to the second desktop software to provide the zoomed-in version of the second series of images shown on the screen of the second sender computer;
(3) obtains from the second sender computer a second plurality of audio packets of second live audio information, wherein the second plurality of audio packets corresponds to: 1) the at least one second computer game played by the second user of the second sender computer, 2) second audio generated by the second user, or 3) both; and
(4) provides the second plurality of audio packets to the network connection associated with the second sender computer for broadcast via the network;
server software stored on a computer readable medium, wherein the server software is operative on the server computer, wherein the server software:
(1) receives the first plurality of video packets broadcast from the network connection of the first sender computer;
(2) receives the first plurality of audio packets broadcast from the network connection of the first sender computer;
(3) receives the second plurality of video packets broadcast from the network connection of the second sender computer;
(4) receives the second plurality of audio packets broadcast from the network connection of the second sender computer;
5 receives via the network, from a first receiver computer, a first channel instruction; and
6 in response to the first channel instruction broadcasts, via the network, to the first receiver computer broadcasted information corresponding to at least one of: (a) the first plurality of video packets and the first plurality of audio packets received by the server computer that are associated with the first sender computer and (b) the second plurality of video packets and the second plurality of audio packets received by the server computer that are associated with the second sender computer.

6. The system of claim 5, wherein the first channel instruction from the first receiver computer is based upon a selection made by a third user of the first receiver computer from a choice of channels provided by the server computer to the first receiver computer.

7. The system of claim 6, wherein the choice of channels provided by the server computer to the first receiver computer comprises at least a first indicia corresponding to the first sender computer and at least a second indicia corresponding to the second sender computer.

8. The system of claim 6, wherein the choice of channels provided by the server computer to the first receiver computer comprises at least a first indicia corresponding to the first user of the first sender computer and at least a second indicia corresponding to the second user of the second sender computer.

9. The system of claim 5, wherein:
the server software further: (5) receives via the network, from a second receiver computer, a second channel instruction; (6) in response to the second channel instruction broadcasts, via the network, to the second receiver computer the broadcasted information corresponding to at least one of: (a) the first plurality of video packets and the first plurality of audio packets received by the server computer that are associated with the first sender computer and (b) the second plurality of video packets and the second plurality of audio packets received by the server computer that are associated with the second sender computer.

10. The system of claim 5, wherein the network comprises at least one of: (a) the Internet; and (b) an intranet.

11. The system of claim 5, wherein the first receiver computer communicates with the server computer using a web browser.

12. The system of claim 5, wherein the first live video information corresponding to the first series of images shown on the screen of the first sender computer further comprises a first feed from a first camera and wherein the second live video information corresponding to the second series of images shown on the screen of the second sender computer further comprises at least one of a second feed from a second camera.

13. The system of claim 9, wherein the at least one first computer game and the at least one second computer game are the same computer game.

14. A system for live broadcasting from a sender computer to a receiver computer via at least one server computer operative on a network, comprising:
desktop software stored on a computer readable medium, wherein the desktop software is operative on the sender computer, wherein the desktop software:
(1) obtains from the sender computer a first plurality of packets of first live video information corresponding to a first series of images shown on a screen of the sender computer, wherein the first series of images corresponds to at least one computer game played by a user of the sender computer;
(2) obtains from the sender computer a second plurality of packets of second live video information corresponding to a second series of images from a camera;
(3) obtains from the sender computer a plurality of audio packets of live audio information, wherein the plurality of audio packets corresponds to: i) the at least one computer game played by the user of the sender computer, ii) the series of images from the camera, iii) audio generated by the user, or iv) at least two of (i) through (iii);
(4) converts the plurality of audio packets of live audio information, the first plurality of packets of first live video information corresponding to the first series of images shown on the screen and the second plurality of packets of second live video information corresponding to the second series of images from the camera into a single composite data stream in the form of a series of data packets; and
(5) provides the series of data packets to a network connection associated with the sender computer for broadcast via the network; and
server software stored on a computer readable medium, wherein the server software is operative on the server computer, wherein the server software:
(1) receives the series of data packets broadcast from the network connection of the sender computer; and
(2) broadcasts, via the network, to the receiver computer broadcasted information corresponding to the series of data packets received by the server computer.

15. The system of claim 14, wherein the network comprises at least one of: (a) the Internet; and (b) an intranet.

16. The system of claim 14, wherein the receiver computer communicates with the server computer using a web browser.

17. A system for live broadcasting from at least one sender computer to at least one receiver computer via at least one server computer operative on a network, comprising:
first desktop software stored on a computer readable medium, wherein the first desktop software is operative on a first sender computer, wherein the first desktop software:
(1) obtains from the first sender computer a first plurality of packets of first live video information corresponding to a first series of images shown on a screen of the first sender computer, wherein the first series of images corresponds to at least one first computer game played by a first user of the first sender computer;
(2) obtains from the first sender computer a second plurality of packets of second live video information corresponding to a second series of images from a camera associated with the first sender computer;
(3) obtains from the first sender computer a first plurality of audio packets of first live audio information, wherein the first plurality of audio packets corresponds to: i) the at least one first computer game played by the first user of the first sender computer, ii) the second series of images from the camera, iii) first audio generated by the first user, or iv) at least two of (i) through (iii);
(4) converts the first plurality of audio packets of first live audio information, the first plurality of packets of first live video information corresponding to the first series of images shown on the screen of the first sender computer and the second plurality of packets of second live video information corresponding to the second series of images from the camera associated with the first sender computer into a first single composite data stream in the form of a first series of data packets; and
(5) provides the first series of data packets to a network connection associated with the first sender computer for broadcast via the network;
second desktop software stored on a computer readable medium, wherein the second desktop software is operative on a second sender computer, wherein the second desktop software:
(1) obtains from the second sender computer a third plurality of packets of third live video information corresponding to a third series of images shown on a screen of the second sender computer, wherein the third series of images corresponds to at least one second computer game played by a second user of the second sender computer;
(2) obtains from the second sender computer a fourth plurality of packets of fourth live video information corresponding to a fourth series of images from a second camera associated with the second sender computer;
(3) obtains from the second sender computer a second plurality of audio packets of second live audio information, wherein the second plurality of audio packets corresponds to: i) the at least one second computer game played by the second user of the second sender computer, ii) the fourth series of images from the second camera, iii) second audio generated by the second user, or iv) at least two of (i) through (iii);
(4) converts the second plurality of audio packets of second live audio information, the third plurality of packets of third live video information corresponding to the third series of images shown on the screen of the second sender computer and the fourth plurality of packets of fourth live video information corresponding to the fourth series of images from the second camera associated with the second sender computer into a second single composite data stream in the form of a second series of data packets; and
(5) provides the second series of data packets to a network connection associated with the second sender computer for broadcast via the network; and
server software stored on a computer readable medium, wherein the server software is operative on the server computer, wherein the server software: (1) receives the first series of data packets broadcast from the network connection of the first sender computer; (2) receives the second series of data packets broadcast from the network connection of the second sender computer;
(3) receives via the network, from a first receiver computer, a first channel instruction; and
(4) in response to the first channel instruction broadcasts, via the network, to the first receiver computer video information corresponding to at least one of: (a) the first series of data packets received by the server computer that are associated with the first sender computer and (b) the second series of data packets received by the server computer that are associated with the second sender computer.

18. The system of claim 17, wherein the first channel instruction from the first receiver computer is based upon a selection made by a third user of the first receiver computer from a choice of channels provided by the server computer to the first receiver computer.

19. The system of claim 18, wherein the choice of channels provided by the server computer to the first receiver computer comprises at least a first indicia corresponding to the first sender computer and at least a second indicia corresponding to the second sender computer.

20. The system of claim 18, wherein the choice of channels provided by the server computer to the first receiver computer comprises at least a first indicia corresponding to the first user of the first sender computer and at least a second indicia corresponding to the second user of the second sender computer.

21. The system of claim 17, wherein:
the server software further: (5) receives via the network, from a second receiver computer, a first channel instruction; (6) in response to the second channel instruction broadcasts, via the network, to the second receiver computer the broadcasted information corresponding to at least one of: (a) the first series of data packets received by the server computer that are associated with the first sender computer; or (b) the second series of data packets received by the server computer that are associated with the second sender computer.

22. The system of claim 17, wherein the network comprises at least one of: (a) the Internet; and (b) an intranet.

23. The system of claim 17, wherein the first receiver computer communicates with the server computer using a web browser.

24. The system of claim 17, wherein the at least one first computer game and the at least one second computer game are the same computer game.

25. A system for live broadcasting from a sender computer, comprising:
   a first software module, wherein the first software module is inserted into a memory space of a first process, wherein the first software module obtains a handle to a screen buffer associated with the sender computer, wherein the first software module iteratively obtains a plurality of frames of video information shown on a screen of the sender computer, wherein the plurality of frames corresponds to at least one computer game played by a user of the sender computer, and wherein the first software module iteratively places the obtained frames in a first software module buffer;
   a second software module that resides inside a second process, and that operatively communicates with the first software module buffer, wherein the second software module encodes the frames from the first software module buffer;
   a third software module, wherein the third software module obtains a plurality of audio frames from an audio device of the sender computer; and
   a broadcast software module that operatively communicates with the second and third software modules, wherein the broadcast module interleaves the video and audio frames from the second software module and the third software module and broadcasts the interleaved frames using at least one Internet protocol,
   wherein the first process is distinct from the second process.

26. The system of claim 25, wherein the first software module iteratively obtains directly from the screen buffer associated with the sender computer the plurality of frames of video information shown on the screen of the sender computer.

27. The system of claim 25, wherein the first software module sends text and graphics to the screen buffer.

28. The system of claim 25, wherein each of the first software module, the second software module, the third software module and the broadcast software module is separate from one another.

29. The system of claim 25, wherein at least the first software module and the second software module are combined.

30. The system of claim 25, wherein at least the second software module and the broadcast software module are combined.

31. The system of claim 25, wherein at least the first software module, the second software module and the broadcast software module are combined.

32. The system of claim 25, wherein at least the first software module, the second software module, and the third software module are combined.

33. The system of claim 25, wherein at least the second software module, the third software module and the broadcast software module are combined.

34. The system of claim 25, wherein at least the second software module and the third software module are combined.

35. The system of claim 25, wherein at least the third software module and the broadcast software module are combined.

36. The system of claim 25, wherein the first process comprises a game.

37. A method for live broadcasting from a sender computer information associated with a viewed device screen, comprising:
   iteratively obtaining from at least one capture device associated with the sender computer a first plurality of frames of video information shown on the screen of the viewed device and a second plurality of frames of audio data;
   wherein the first plurality of frames of video information corresponds to at least one computer game played by a user of the viewed device;
   wherein the second plurality of frames of audio data corresponds to: i) the first plurality of frames of video information, ii) audio generated by the user, or iii) both;
   iteratively placing the obtained frames in software module buffers;
   encoding the frames from the software module buffers;
   interleaving the audio and the video frames; and
   broadcasting the encoded frames using at least one Internet protocol.

38. The method of claim 37, wherein the steps are carried out in the order recited.

* * * * *